United States Patent
Sanada et al.

[11] Patent Number: 5,678,419
[45] Date of Patent: Oct. 21, 1997

[54] EVAPORATOR FOR A REFRIGERATING SYSTEM

[75] Inventors: Ryoichi Sanada, Kariya; Masahiro Shimoya, Chiryu, both of Japan

[73] Assignee: Nippondenso Co., Ltd, Kariya, Japan

[21] Appl. No.: 498,078

[22] Filed: Jul. 5, 1995

[30] Foreign Application Priority Data

Jul. 5, 1994  [JP]  Japan .................... 6-153734

[51] Int. Cl.⁶ ........................... F25B 39/02
[52] U.S. Cl. ............ 62/205; 62/196.4; 62/513
[58] Field of Search ............... 62/113, 512, 513, 62/205, 204, 511, 199, 198, 196.1, 196.4

[56] References Cited

U.S. PATENT DOCUMENTS

| | | | |
|---|---|---|---|
| 5,174,123 | 12/1992 | Erickson | 62/113 |
| 5,222,551 | 6/1993 | Hasegawa et al. | 165/167 |
| 5,245,843 | 9/1993 | Shimoya et al. | 62/515 |
| 5,390,507 | 2/1995 | Shimoya et al. | 62/513 X |

*Primary Examiner*—Harry B. Tanner
*Attorney, Agent, or Firm*—Cushman, Darby & Cushman IP Group of Pillsbury Madison & Sutro LLP

[57] ABSTRACT

An evaporator for a refrigerant system having a heat exchanging section and a evaporating section of a total flow type having a bottom inlet tank for receiving a refrigerant from the heat exchanging section, a bottom outlet tank for a discharge of the refrigerant and a stack of flatten pipes, each defining a refrigerant passageway of U-shape connecting the bottom inlet tank and bottom outlet tank. The heat exchanging section controls the degree of the dryness of the refrigerant in a range between 0.01 to 0.2. The flattened pipe has an inner thickness in a direction of the stack in a range between 2.0 to 3.0 mm.

5 Claims, 21 Drawing Sheets

EVAPORATOR FOR A REFRIGERATING SYSTEM

BACKGROUND OF THE INVENTION

1. Field of the Invention

The present invention relates to an evaporator for use in a refrigerating system in the execution of a refrigerating cycle, and, in particular, an evaporator wherein a plurality of evaporating passageways for a refrigerant are provided so that these evaporating passageways are spaced in parallel.

2. Description of Related Art

As well known, an air conditioning system that is used, for example, in an automobile, includes a refrigerating apparatus which includes a compressor, a condenser, a receiver, an expansion valve (pressure reducer) and an evaporator. An air flow for air conditioning of a cabin is brought into contact with the evaporator, so that a heat exchange occurs between the flow of air and a flow of the refrigerant, thereby cooling the air flow. Namely, the air is passed through the expansion valve and subjected to an isothermal expansion process so as to provide a gas and liquid two-phase combined state of the refrigerant, which is introduced into the evaporator. At the evaporator, the refrigerant is evaporated, while absorbing heat from the air flow contacting the evaporator, thereby cooling the air flow. As a result, the refrigerant is finally issued from the evaporator under a superheated condition.

An evaporator is known, which is constructed by a stack of flattened heat exchanging pipes and fins, which are alternately arranged (see Japanese Unexamined Patent Publication No. 2-50059). Each pipe unit is constructed by a pair of facing plates for forming therebetween an evaporation passageway for the refrigerant. In this type of evaporator, the smaller the value of the thickness of the heat exchanging pipe along the direction of the stack of the pipes, the higher is the heat exchanging efficiency. Typically, a value of the thickness of the heat exchanging pipe of less than 3.5 mm is desirable to obtain a desired heat exchanging performance. However, such a reduction in the thickness of the flattened heat exchanging pipe causes the distribution of the refrigerant to be worsened, when the refrigerant is in a dried condition, i.e., when a degree of a dryness, which is a ratio of the amount of the refrigerant in a gaseous phase to the total amount of the refrigerant, is higher than a predetermined value, such as 0.2. The refrigerant introduced into the evaporation passageways, which is in a gas-liquid combined state, is easily separated between a gaseous state and a liquid state. When the refrigerant is distributed between the pipe units, a situation may easily arise, where a value of the degree of dryness is varied between the pipe units. As is well known, the refrigerant has a higher heat transfer coefficient, i.e., a higher cooling capacity when the refrigerant is in a liquid state than when the refrigerant is in a gaseous state. As a result, the uneven distribution of the ratio between the amounts of the gaseous state refrigerant and the liquid state refrigerant causes heat exchange efficiency to be locally reduced particularly at a downstream location of the evaporator. As a result, an uneven distribution of the temperature of air introduced into the cabin occurs.

As a solution to this problem, Japanese Unexamined Patent Publication No. 2-50059 also proposes a so-called "three turn" system, which has a first and second tanks arranged at the top of the evaporator, and U-shaped pipes which are in parallel and connecting the tanks with each other. The first tank has an inner partition for dividing the space inside the first tank into a first and a second chambers. The evaporating passageways are divided into a first group connected to the first chamber and a second group connected to the second chamber. The refrigerant is first introduced into the first chamber via an inlet port. From the first chamber, the refrigerant is introduced into a side of the second tank via the first group of the refrigerant evaporating passageways. In the first group of the passageways, the refrigerant is first moved downwardly. At the bottom, the direction of the flow of the refrigerant is reversed so that the refrigerant is now moved upwardly. In other words, a U-shaped flow of the refrigerant is obtained. Then, the refrigerant flows in the second chamber and is flown into the opposite side of the second tank, which is in communication only with the second group of the refrigerant evaporating passageways. In the second group of the refrigerant evaporating passageways, a similar U-shaped flow of the refrigerant is again obtained. Namely, in the second group of the passageways, the refrigerant is first moved downwardly, and, at the bottom, the direction of the flow of the refrigerant is reversed so that the refrigerant is now moved upwardly. The refrigerant is introduced into the second chamber of the first tank, from which the refrigerant is discharged via an outlet port.

In this "three turn" system, all of the passageways (heat exchanging pipes) cannot be used for introduction of the refrigerant. Namely, some of the pipes are used for an introduction of the refrigerant, while the remaining pipes are used for removing the refrigerant. When the number of the pipes is ten, five pipes can, for example, used for the introduction of the refrigerant, while five pipes can be used for the removal of the refrigerant. When seven pipes are used for the introduction of the refrigerant, three pipes are used for the removal of the refrigerant. In the three turn system, the flow of the refrigerant is subjected to three changes in the direction of the flow, on one hand, and the flow of the refrigerant is introduced into only a part of the pipes, on the other hand, thereby increasing the flow resistance. An increase in the flow resistance causes the pressure of the evaporated refrigerant at the evaporator to be reduced, thereby reducing evaporating capacity. In order to prevent the flow resistance from being highly increased, a heat exchanging pipe of a large inner thickness must be employed, which causes, however, the heat exchanging capacity to be reduced at the evaporator, thereby reducing evaporating performance.

SUMMARY OF THE INVENTION

An object of the present invention is to provide an evaporator capable of providing an increased evaporating performance.

Another object of the present invention is to provide an evaporator capable of providing a reduced pressure loss, with an increased heat exchanging capacity.

Still another object of the present invention is to provide an evaporator capable of preventing a flow resistance from being reduced, using a reduced value of the inner thickness of a flattened heat exchanging pipe.

According to the present invention, a refrigerating system is provided, comprising:

a compressor for compressing a refrigerant;

a condenser connected to the compressor for condensing the refrigerant from the compressor;

a pressure reducer connected to the condenser for reducing a pressure of the condensed gas;

an evaporator connected to the pressure reduced for evaporating the refrigerant from the pressure reducer, and;

means arranged between the pressure reducer and the evaporator for controlling a degree of dryness of the refrigerant introduced into the evaporator.

The evaporator also comprises:

a stack of flattened tubes defining therein vertically extending heat exchanging passageways;

an inlet tank at a bottom of the stack for distributing, into all of the heat exchanging passageways, the refrigerant after it has passed through the dryness control means; and an outlet tank at a bottom of the stack for discharging the refrigerant after it has passed through the heat exchanging passageways.

The arrangement of the dryness control means with respect to the evaporator is such that a value of the degree of the dryness at the inlet tank is in a range between 0.01 to 0.2, and a value of the thickness of each flattened tubes is in a range between 2.0 to 3.0 mm.

According to the present invention, the provision of the dryness control means allows the degree of the dryness of the refrigerant introduced into the evaporator to be controlled in a range between 0.01 to 0.2, thereby obtaining a uniform distribution of the refrigerant to the evaporating passageways of the evaporator, despite the fact that the full flow system is employed where an introduction of the refrigerant is done along all of the evaporating passageways. Furthermore, the employment of the entire flow system allows the pressure loss to be reduced, despite the fact that the thickness of the heat exchanging pipe is as small as a value between 2.0 to 3.0 mm. As a result, an increased evaporating performance can be obtained.

BRIEF DESCRIPTION OF ATTACHED DRAWINGS

FIG. 1 schematically illustrates a refrigerating system according to the present invention.

Figure 14:
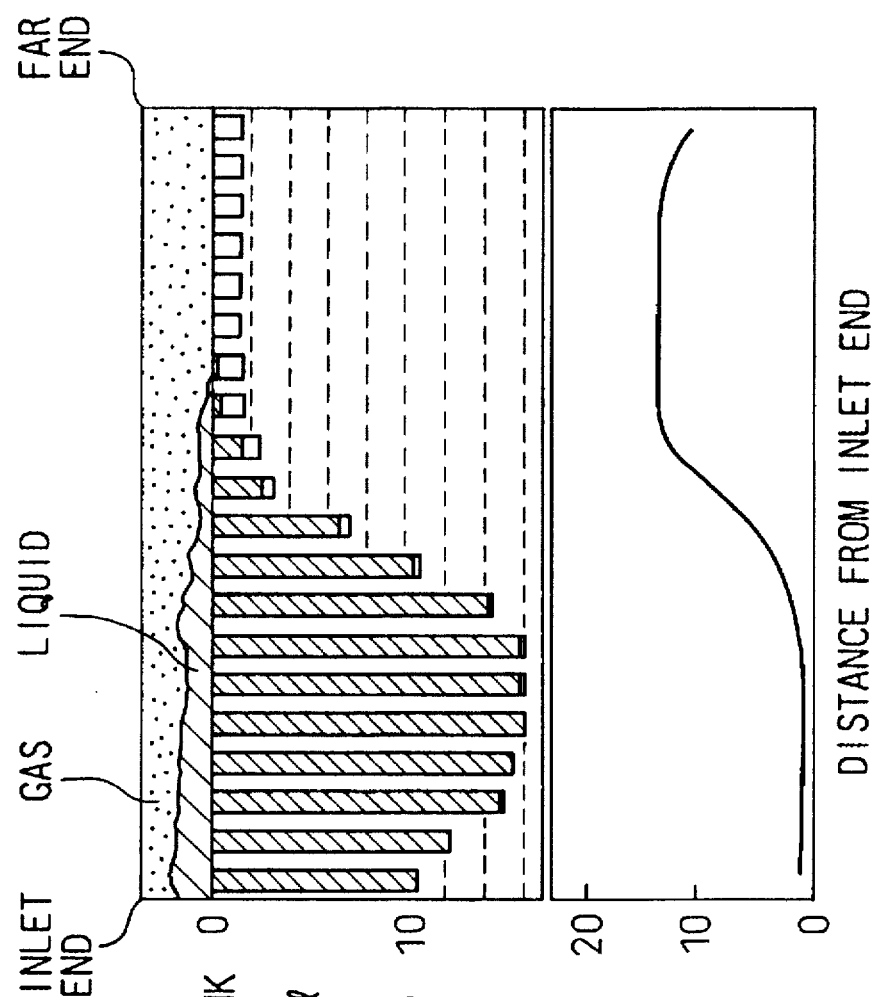
Figure 15:
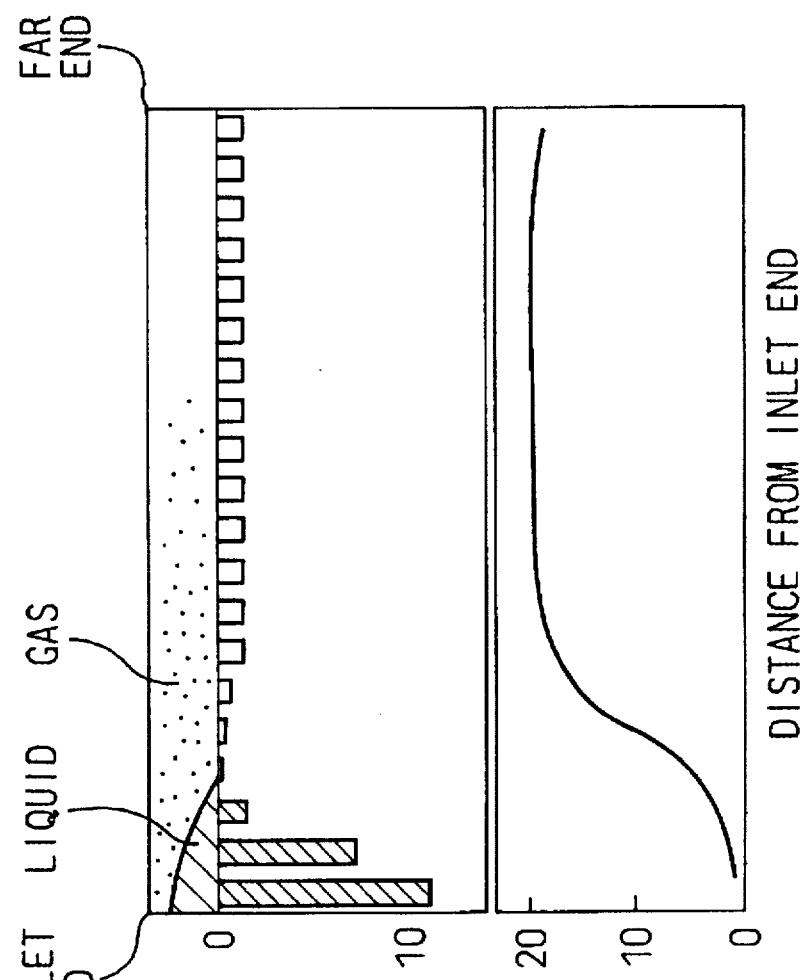

FIGS. 14-A to 14-C illustrating, during a high load condition, a refrigerant distribution, a refrigerant amount and a temperature difference, respectively, along the stack of the plates in a construction where the inlet tank is located at the top;

FIGS. 15-A to 15-C are similar to FIGS. 14-A to 14-C, respectively, but illustrate conditions when the load is low.

Figure 16:
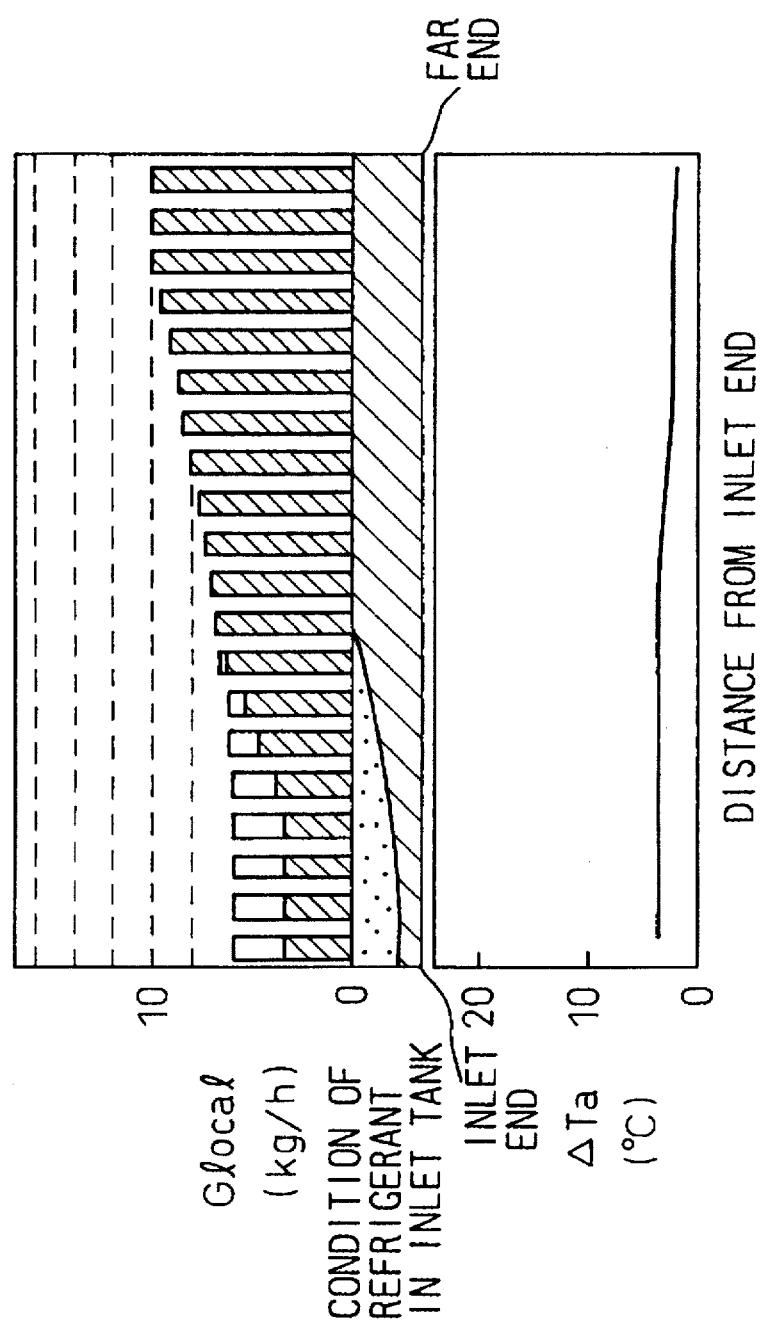

FIGS. 16-A to 16-C illustrating, during a high load condition, a refrigerant amount, a refrigerant distribution and a temperature difference, respectively, along the stack of the plates in the construction according to the present invention.

Figure 17:
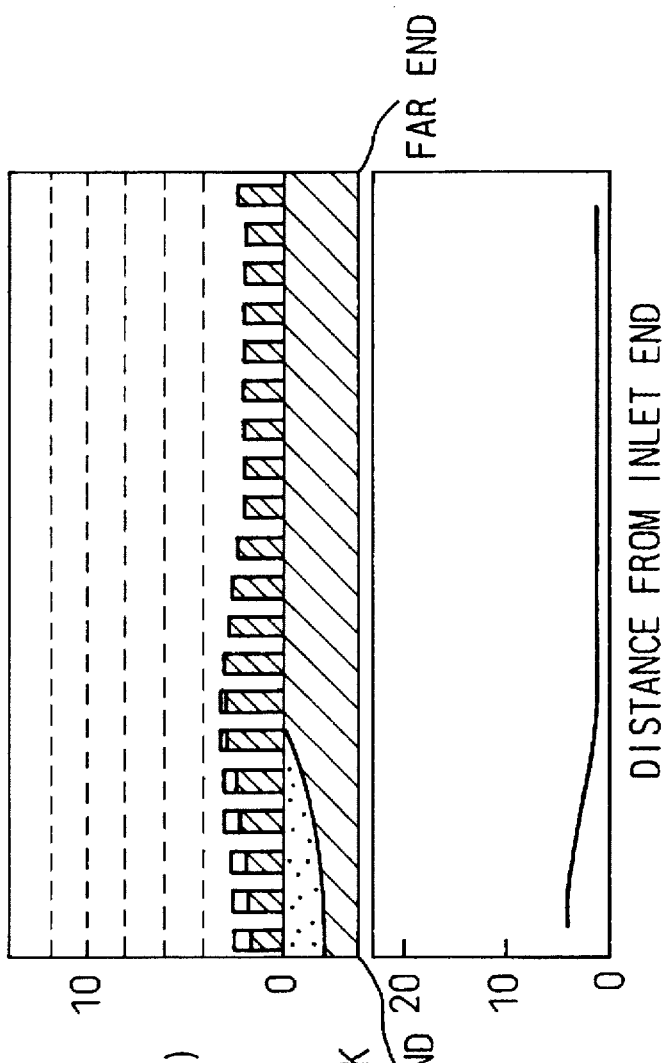

FIGS. 17-A to 17-C are similar to FIGS. 16-A to 16-C, respectively, but illustrate conditions when the load is low.

Figure 18:
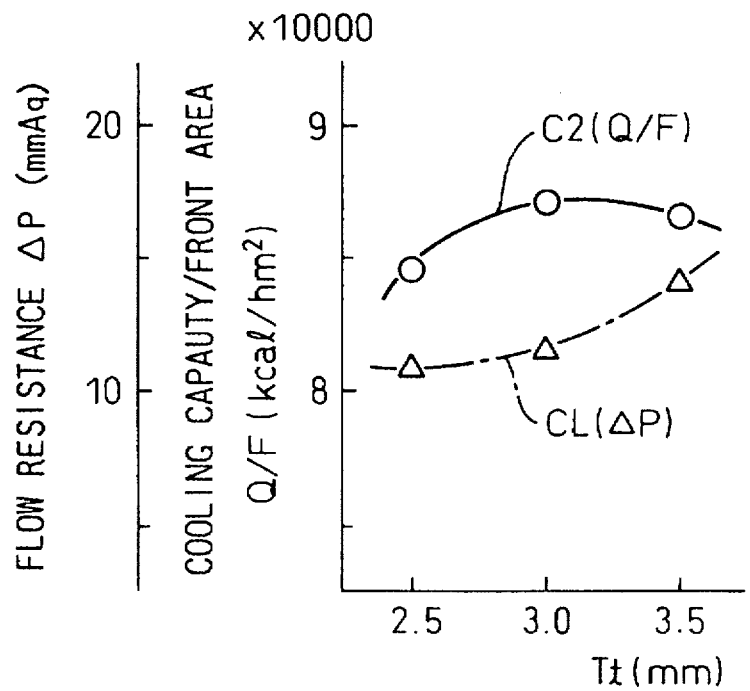

FIG. 18 shows a relationship between a thickness of the flattened tube of the evaporator and the flow resistance as well as a relationship between the thickness of the flattened tube and a ratio of the cooling capacity to a value of a front surface area of the evaporator.

Figure 19:
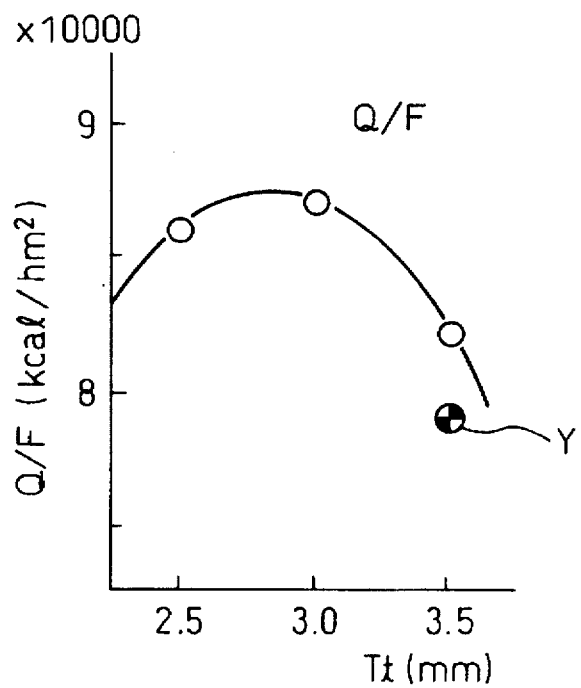

FIG. 19 shows a relationship between a thickness of the flattened tube of the evaporator and a compensated value of the ratio of the cooling capacity to a value of a front surface area of the evaporator.

Figure 20:
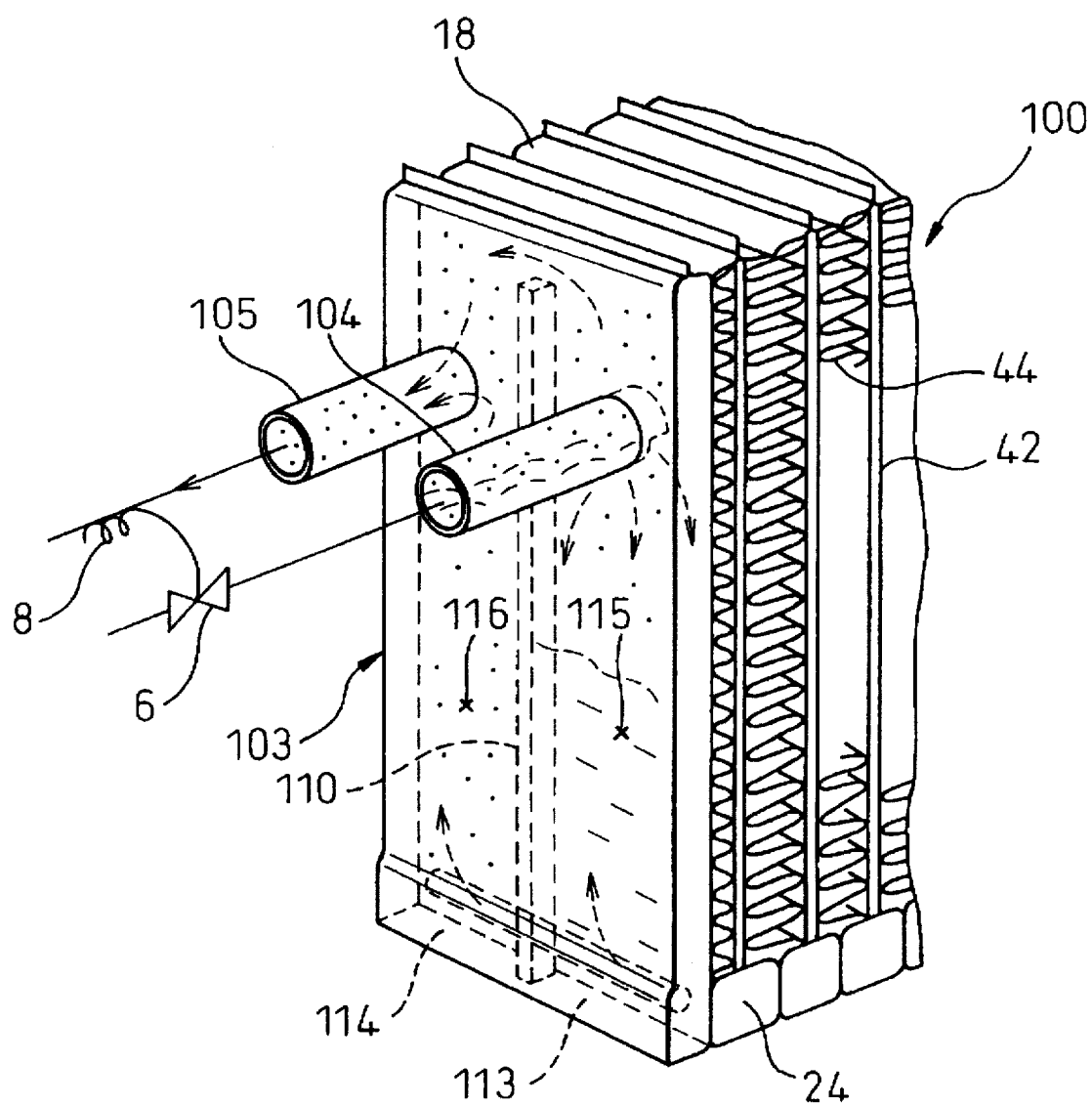

FIG. 20 shows a perspective view of an evaporator in a second embodiment.

Figure 21:
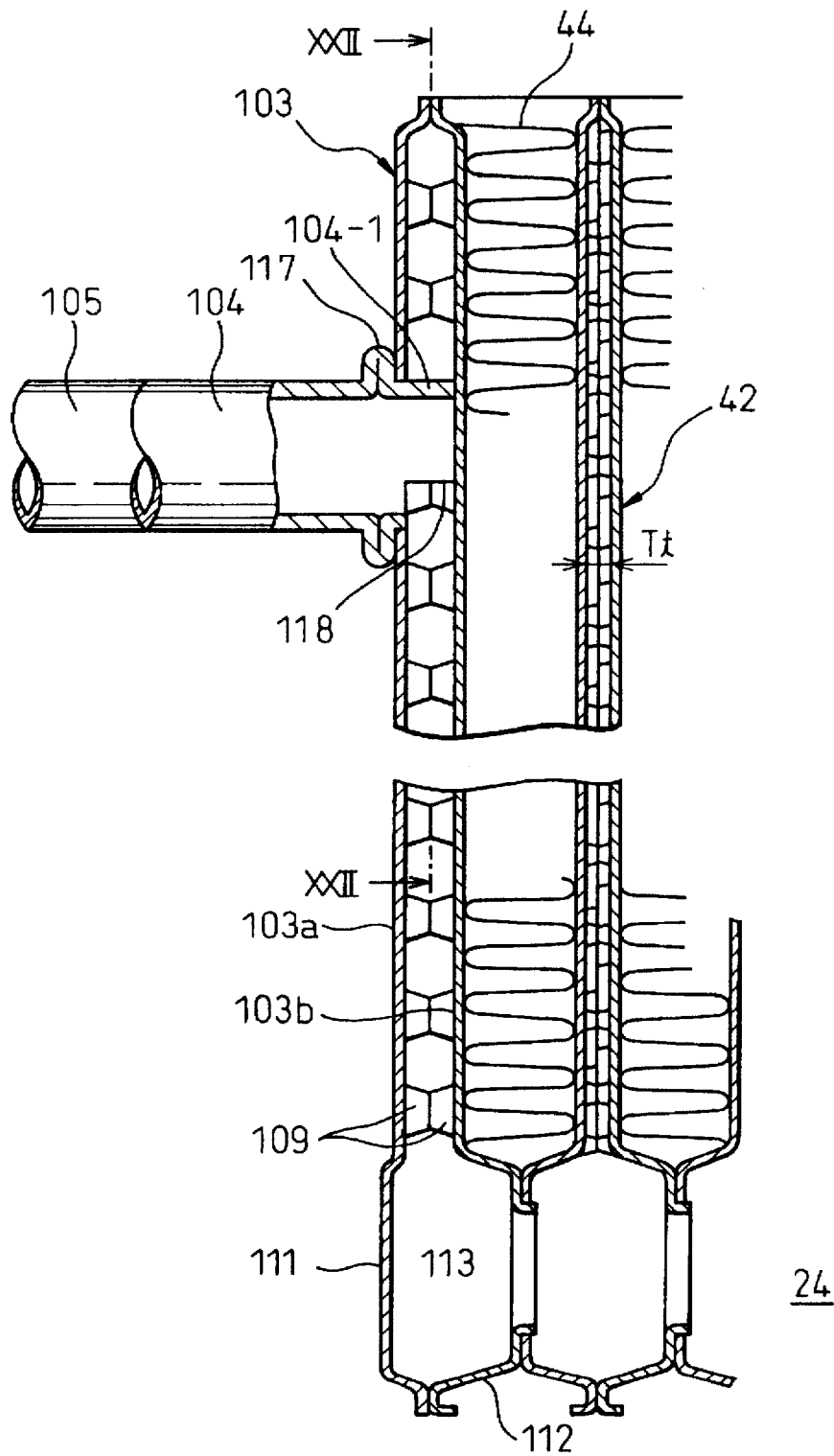

FIG. 21 is a cross-sectional view of a phase separator in the evaporator in FIG. 20.

Figure 22:
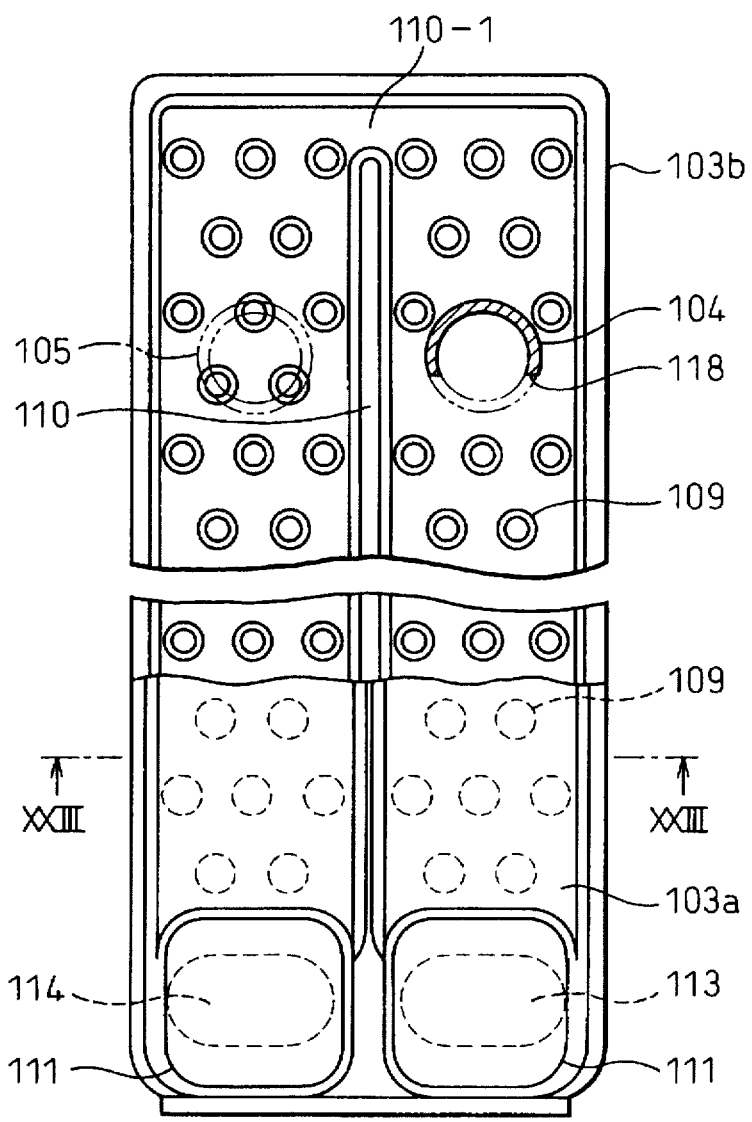

FIG. 22 is a cross-sectional view taken along a line XXII—XXII in FIG. 21.

Figure 23:
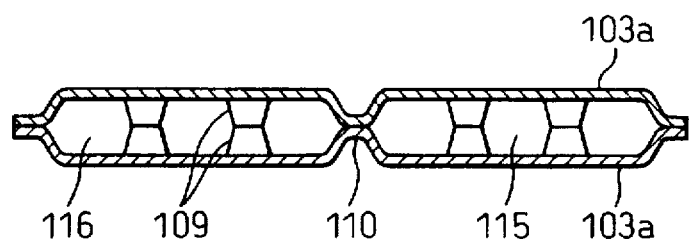

FIG. 23 is a cross-sectional view taken along a line XXIII—XXIII in FIG. 22.

Figure 24:
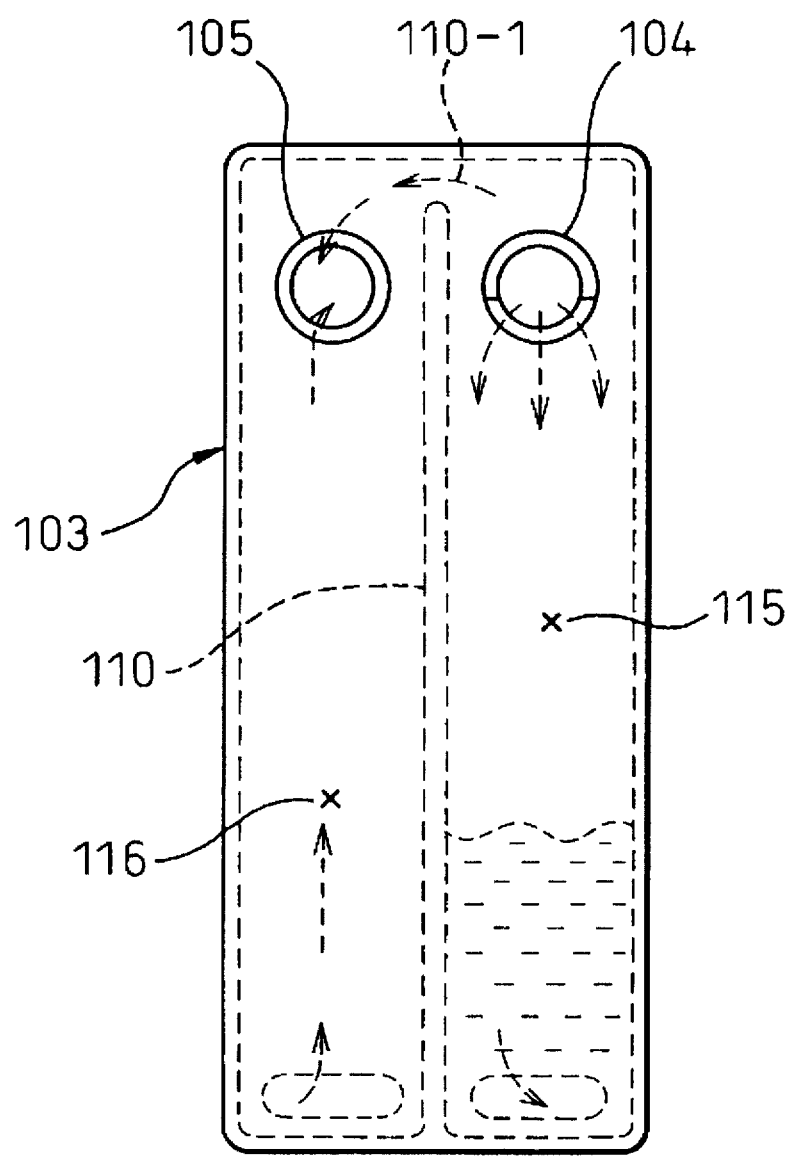

FIG. 24 is a schematic front elevational view of the phase separator in the second embodiment.

DESCRIPTION OF PREFERRED EMBODIMENTS

Figure 1:
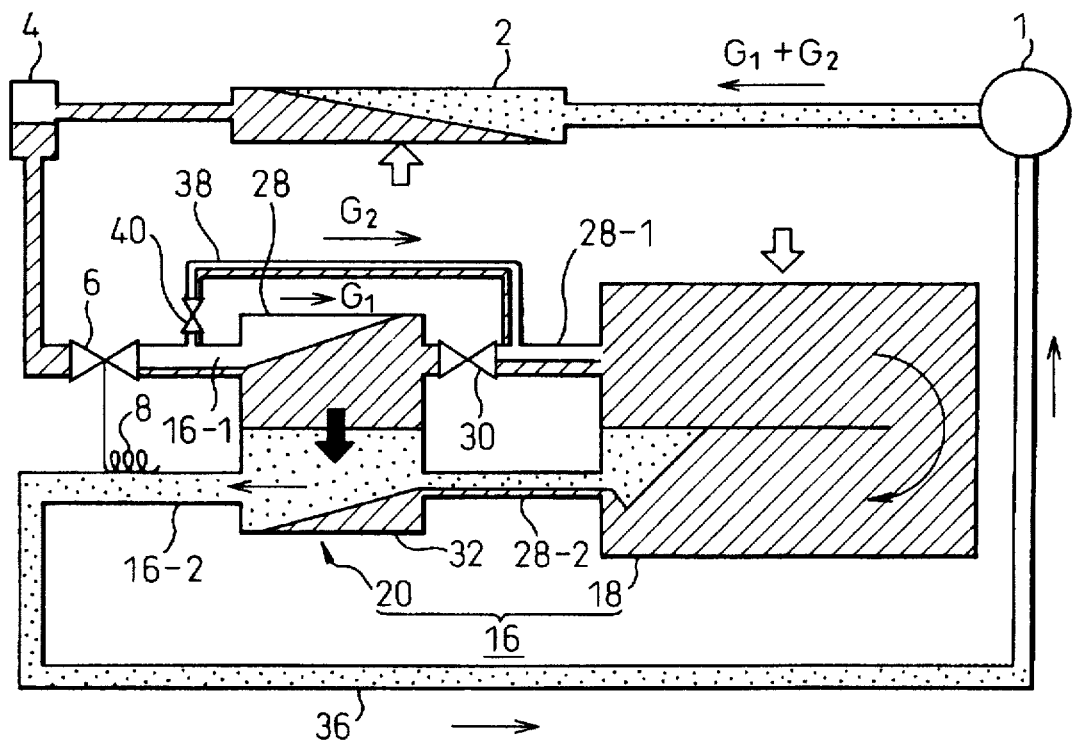

FIG. 1 shows schematically a refrigerating system including an evaporator according to a first embodiment of the present invention. A reference numeral 1 denotes a compressor, which is driven by a suitable source of rotating movement, such as a crankshaft of an internal combustion engine of a vehicle. A gaseous state refrigerant is subjected to compression at the compressor 1 and is introduced into a condenser 2. At the condenser 2, the refrigerant from the compressor 1 is cooled, so that the refrigerant is condensed to a liquid state, and is introduced into a receiver 4. At the receiver 4, the liquid state refrigerant is temporarily stored, and dust and moisture components in the refrigerant are separated. The liquid state refrigerant from the receiver 4 is introduced into an expansion valve 6, where the pressure of the refrigerant is reduced. The refrigerant is then introduced into an evaporator 16, where the refrigerant is gasified. The gaseous state refrigerant is returned to the compressor 1 to repeat this cycle.

Figure 2:
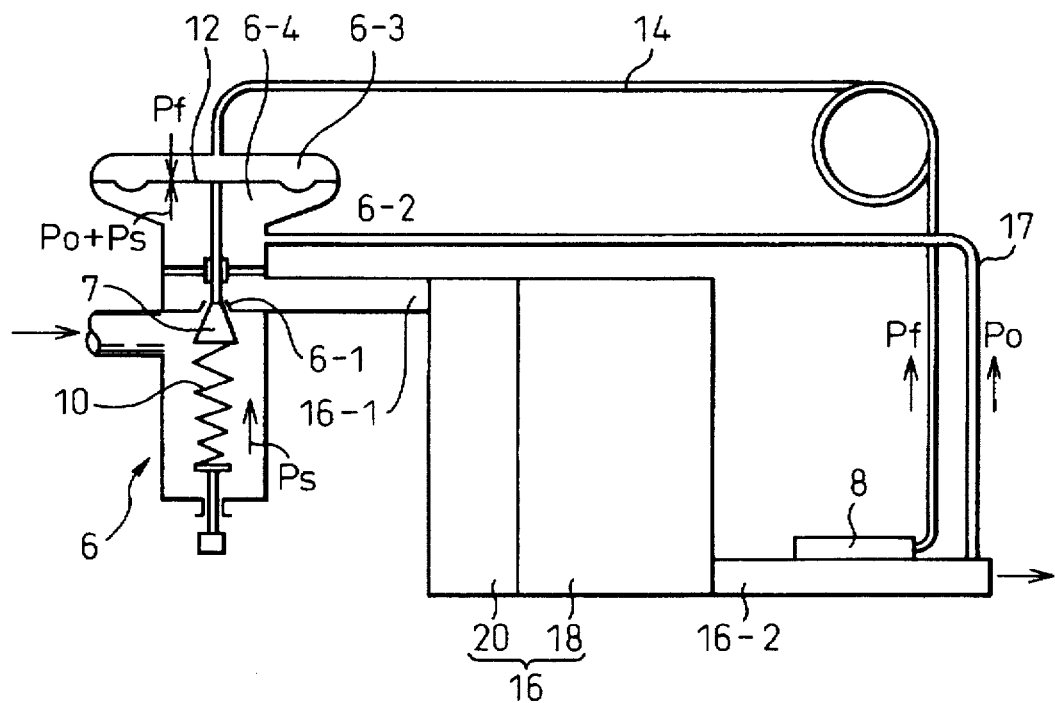
FIG. 2 illustrates a detail of an expansion valve in FIG. 1.

The expansion valve 6 includes a valve member 7 (FIG. 2) located in a passageway connecting the receiver 4 with an inlet 16-1 of the evaporator 16. The valve member 7 faces a variable orifice 6-1 for controlling a degree of the throttle at the orifice 6-1. The expansion valve 6 thus operates as a pressure reduction valve. However, in place of the variable pressure reduction valve, a valve of a fixed orifice can be used. In FIG. 2, the variable expansion valve 6 includes a spring 10 which urges the valve member 7 so that the degree of opening of the orifice 6-1 is reduced, a rod 6-2 extending from the valve member 7, and a diaphragm 12 which is connected to an upper end of the rod 6-2. An upper chamber 6-3 is formed on one side of the diaphragm 12 remote from the rod 6-2, while a lower chamber 6-4 is formed on the other side of the diaphragm 12 adjacent the rod 6-2. As is well known, a thermo-sensitive tube 8 is arranged at an outlet 16-2 of the evaporator 16. A space inside the thermo-sensitive tube 8 is in communication with the upper chamber 6-3 of the expansion valve 6 via a capillary tube 14. Contrary to this, the lower chamber 6-4 of the expansion valve 6 is in communication with the outlet 16-2 of the evaporator 16 via a pressure equalizing tube 17.

An increase in the temperature of the refrigerant at the outlet 16-2 of the evaporator 16, i.e., an increase in an air conditioning load causes the pressure Pf at the thermo-sensitive tube 9, which is opened to the upper chamber 6-3 of the valve 6, to be increased. As a result, the diaphragm 12 is moved downwardly against the force of the spring 10, so that the valve member 7 is moved thus increasing the degree of the opening of the throttle 6-1, and thereby increasing an amount of the refrigerant to be recirculated. Furthermore, the lower chamber 6-3 is under a pressure P0 at the outlet 16-2 of the evaporator 16, which, together with the spring 10, urges the diaphragm 12 to move upwardly. As a result, a degree of opening of the orifice 6-1, i.e., the lift of the valve 7, is obtained so as to obtain a balance between a downwardly directed force in the diaphragm 12 by the pressure $P_f$ at the upper chamber 6-3 and an upwardly directed force by the pressure $P_e$ in the lower chamber 6-4 plus the force Ps of the spring 10. As a result, compensation of the pressure at the outlet 16-2 of the evaporator 16 is done in accordance with the pressure at the thermo-sensitive tube 8, i.e., the temperature of the refrigerant.

Figure 3:
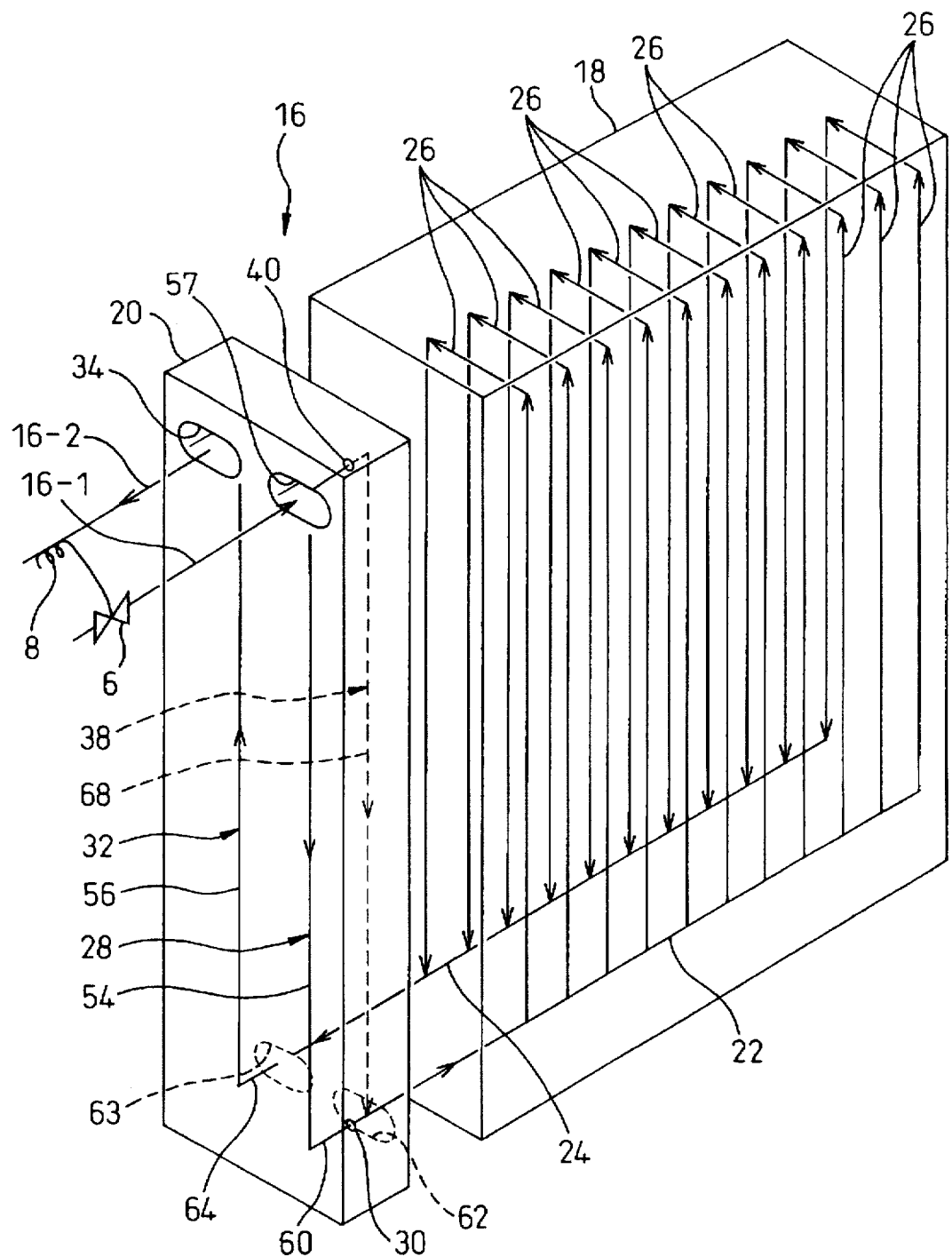
FIG. 3 is a schematic illustration of an evaporator in FIG. 1.

As shown in FIG. 1, the evaporator 16 is constructed by a refrigerant evaporating section 18 and a heat exchanger section 20. In FIG. 3, the refrigerant evaporating section 18 includes, at its bottom portion, an inlet tank 22 and an outlet tank 24. The inlet and the outlet tanks 22 and 24 are connected with each other by means of refrigerant evaporating passageways 26 which are arranged in parallel with each other in such a manner that a heat exchange occurs between the refrigerant passing through the passageways 26 and the air flow introduced into the cabin. A detailed construction of the refrigerant evaporating section 18 will be explained later.

As shown in FIG. 3, the heat exchanger section 20 includes an inlet passageway 28 in which the refrigerant directed to the evaporating section 18 passes and an outlet passageway 32 in which the refrigerant from the evaporating section 18 passes. The inlet and outlet passageways 28 and 32 are arranged so that a heat exchange occurs between an inflow of the refrigerant in the inlet passageway 28 and an outflow of the refrigerant in the outlet passageway 32. The inlet passageway 28 has a first (top) opening 57 connected to the inlet pipe 16-1 from the expansion valve 6 and a second (bottom) opening 62 connected, via a first orifice 30, to the inlet tank 22 of the evaporator section 18. The outlet passageway 32 has a first (bottom) opening 63 connected to the outlet tank 24 of the evaporator section 18 and a second (top) opening 34 connected to the outlet pipe 16-2 to the compressor 1.

As shown in FIGS. 1 and 3, a by-pass passageway 38 has a first (top) end connected to the inlet passageway 28 at a location adjacent the inlet 57 and a second end connected to inlet passageway 28 at a location downstream from the first orifice 30. Furthermore, as shown in FIG. 1, a by-pass control valve 40 is arranged in the by-pass passageway 38.

Figure 4:
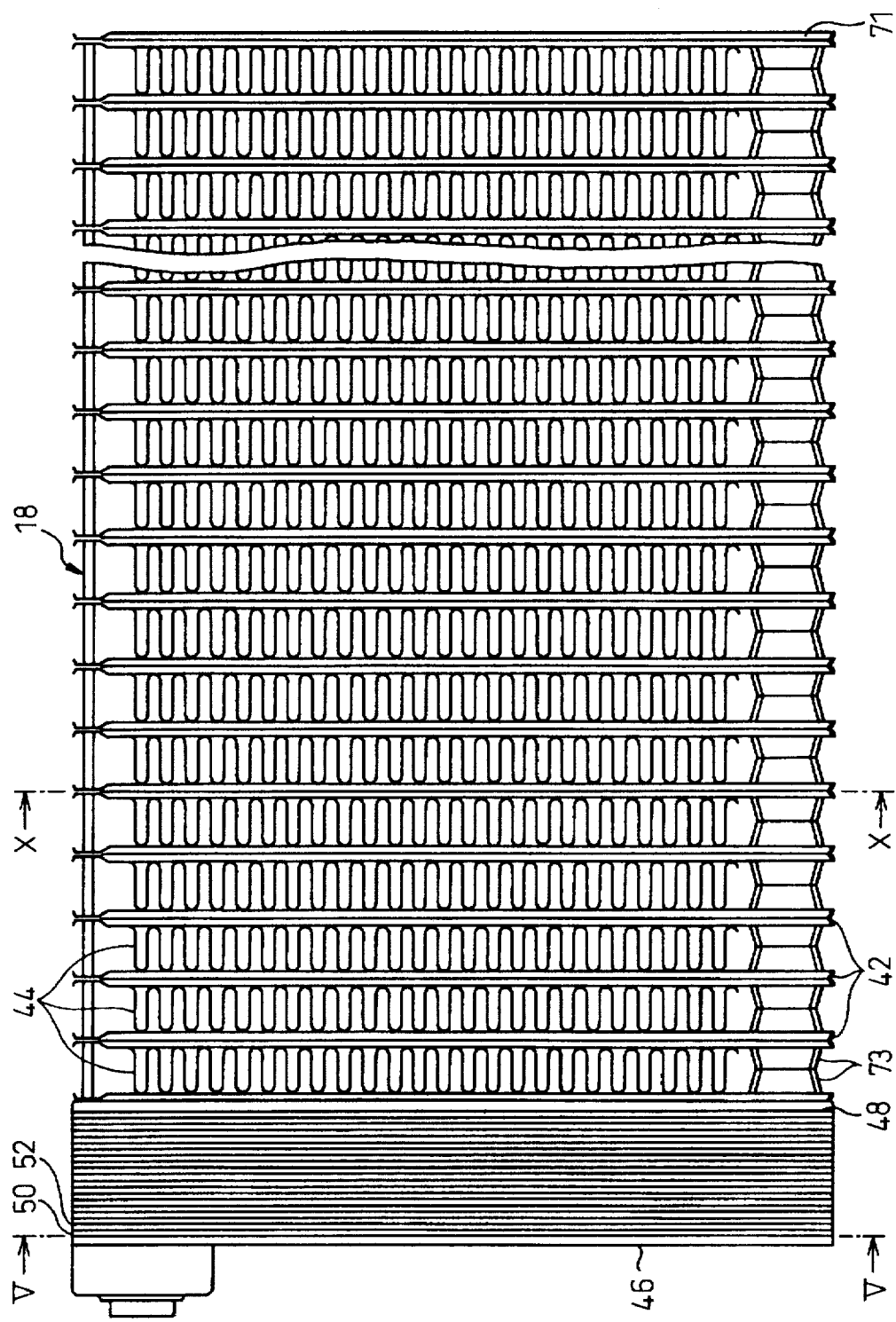
FIG. 4 is a side elevational view of the evaporator.
Figure 5:
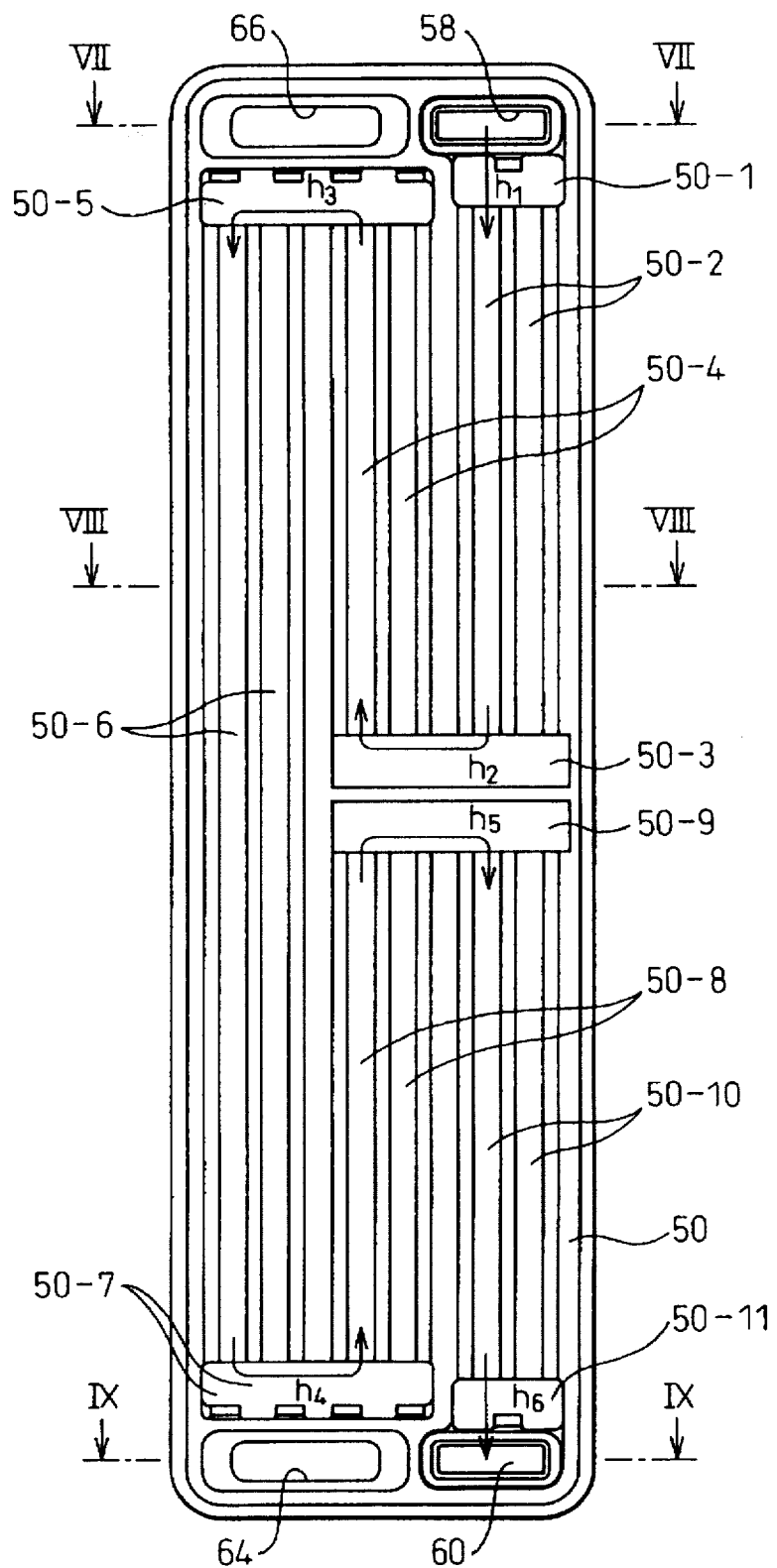
FIG. 5 is a view taken along line V—V in FIG. 4, and shows a front view of a heat exchanging plate in a heat exchanging section of the evaporator.
Figure 7:
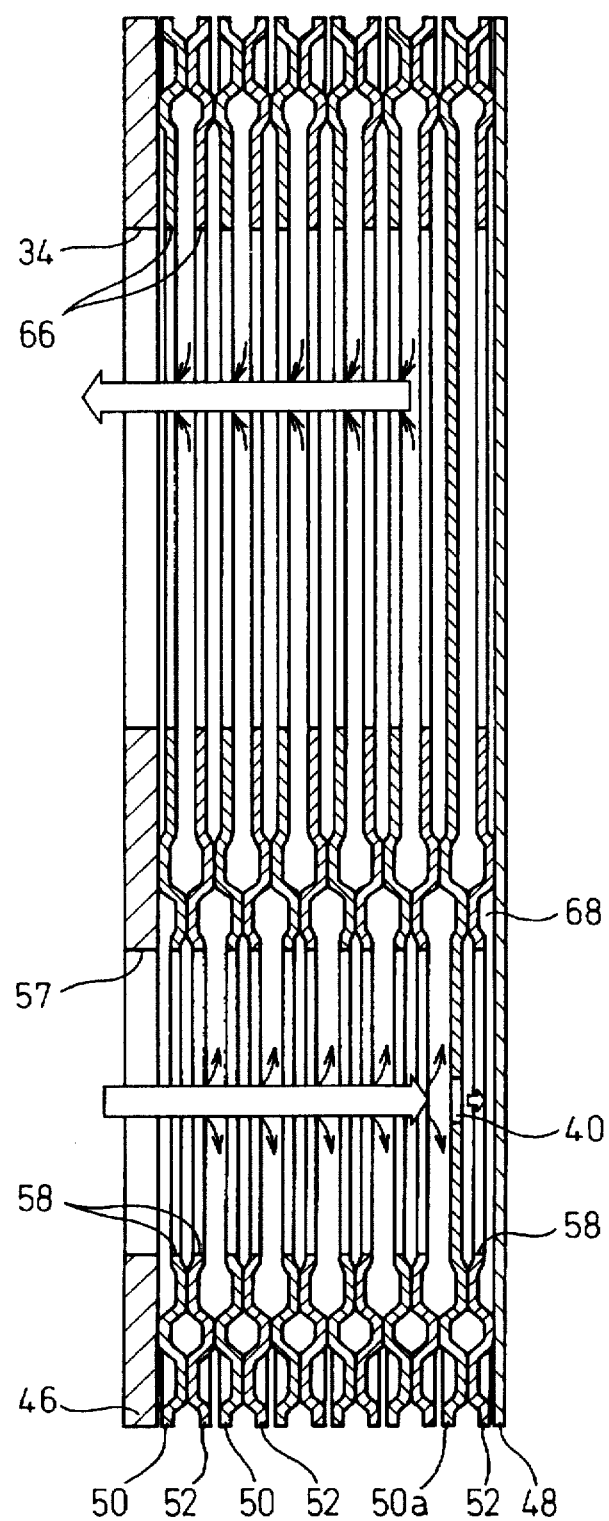
FIG. 7 is a cross-sectional view taken along line VII—VII in FIG. 5.
Figure 8:
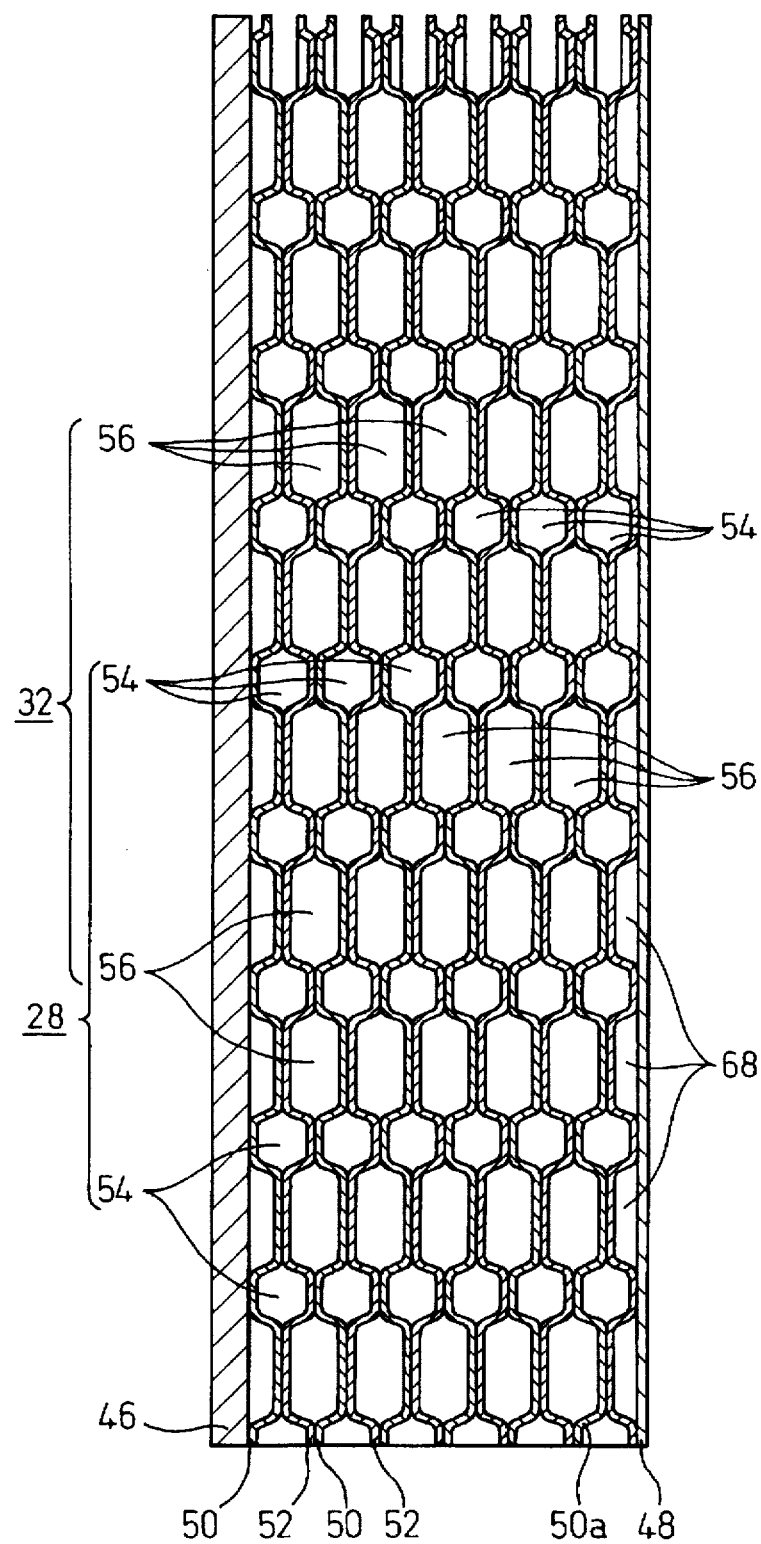
FIG. 8 is a cross-sectional view taken along line VIII—VIII in FIG. 5.
Figure 9:
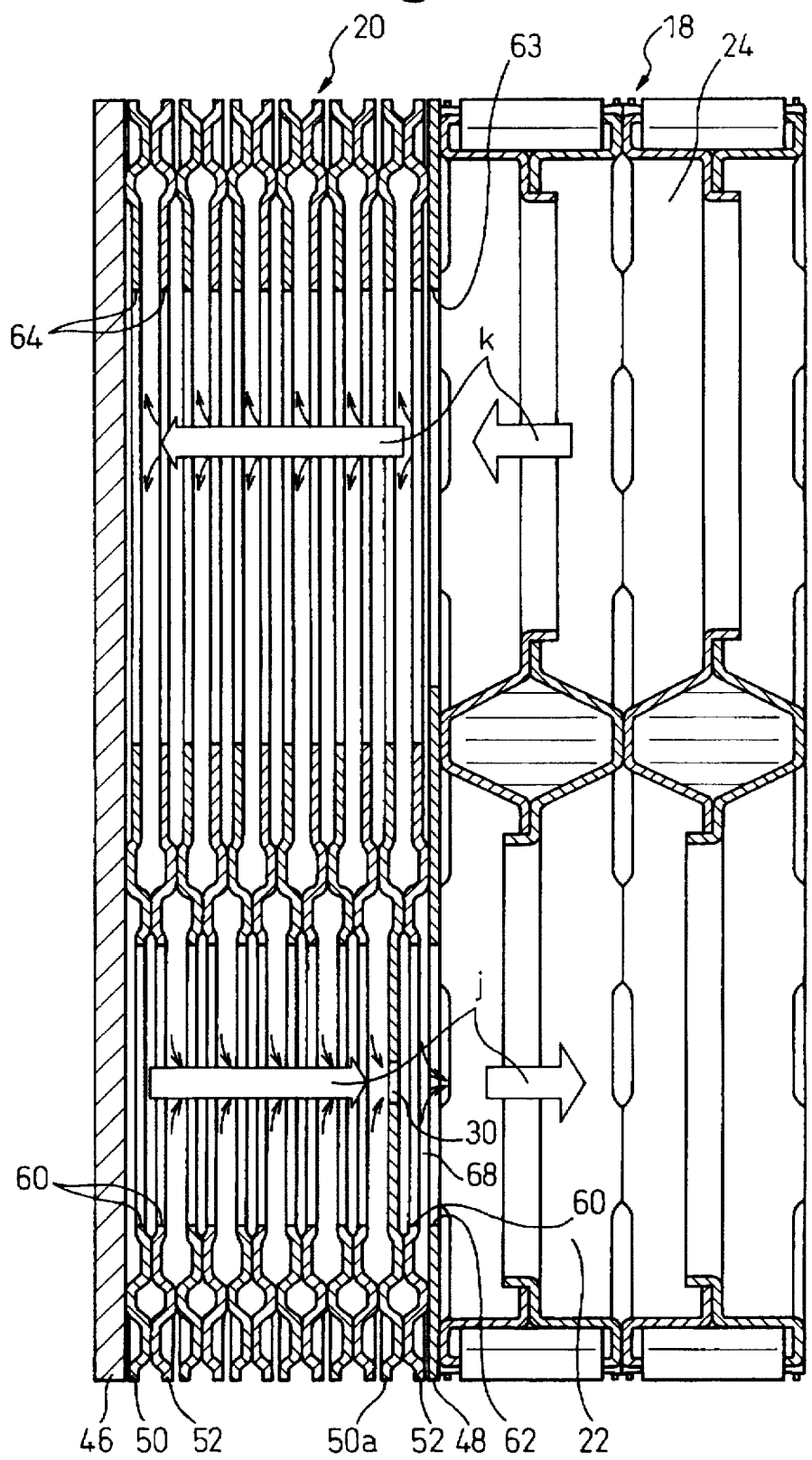
FIG. 9 is a cross-sectional view taken along line IX—IX in FIG. 5.

In FIG. 4, the heat exchanger section 20 is constructed by a stack of a plurality of sets of first and second plates 50 and 52, which are alternately arranged between a first and second end plates 46 and 48. As shown in FIGS. 7, 8 and 9, the first and the second plates 50 and 52 in each set have symmetrical shapes. The first and the second plates 50 and 52 are formed with alternate projected and recessed portions, which, under the stacked conditions, form a plurality of first passageways 54 between facing inner surfaces of the adjacent first and second plates 50 and 52, and a plurality of second passageways 56 between facing outer surfaces of the adjacent second and first plates 52 and 50. The inlet passageway 28 in FIG. 3 is constructed by the first passageways 54, while the outlet passageway 32 is constructed by the second passageways 56. As shown in FIGS. 5 and 7, the first end plate 46 is formed with the top opening 57, which cooperates with top openings 58 in the first and second plates 50 and 52, so as to create an inlet passageway connected to the inlet pipe 16-1, which is in communication with the first passageways 54. The first and second plates 50 and 52 form bottom openings 60, which are in communication with the first passageways 54.

In order to create a flow of the refrigerant in the first passageway 54, a plate 50 is formed with, at their facing inner surfaces, recesses 50-1 (FIG. 5) which are opened to the inlet openings 58 and which are opened to vertical recesses 50-2 at their top ends. The recesses 50-2 has bottom ends opened to a recess 50-3 at the middle of the plates 52. Opened to the recess 50-3 are bottom ends of vertical recesses 50-4. The top ends of the recesses 50-4 are opened to a recess 50-5, which is separated from the outlet opening 66. Vertical recesses 50-6 are further provided, which have top ends opened to the recess 50-5 and bottom ends opened to a recess 50-7, which is separated from the opening 64. Furthermore, vertical recesses 50-8 are provided, which have bottom ends opened to the recess 50-7 and top ends opened to lateral recess 50-9 at the middle of the plate 50. Finally, vertical recesses 50-10 are further provided, which have top ends opened to the middle lateral recess 50-9 and bottom ends opened to a recess 50-11 which is opened to the opening 60. The plates 52 have a similar structure. As a result, the recesses 50-2, 50-4, 50-6, 50-8 and 50-10 between the facing inner surfaces of the plates 50 and 52 are combined to form the first passageways 54. As a result, a flow of the refrigerant in the first tank 24 from the top openings 58 to the bottom openings 60 is obtained as illustrated by arrows $h_1$, $h_2$, $h_3$, $h_4$ and $h_5$ in FIG. 5. Furthermore, only the first plate 50, which is located adjacent the end plate 48 and which is designated by 50a (FIG. 6), is formed with, in place of the opening 60, a throttled opening functioning as the first orifice 30. The first orifice 30 is in communication with the inlet tank 22 of the evaporating section 18, as shown in FIG. 9.

Figure 6:
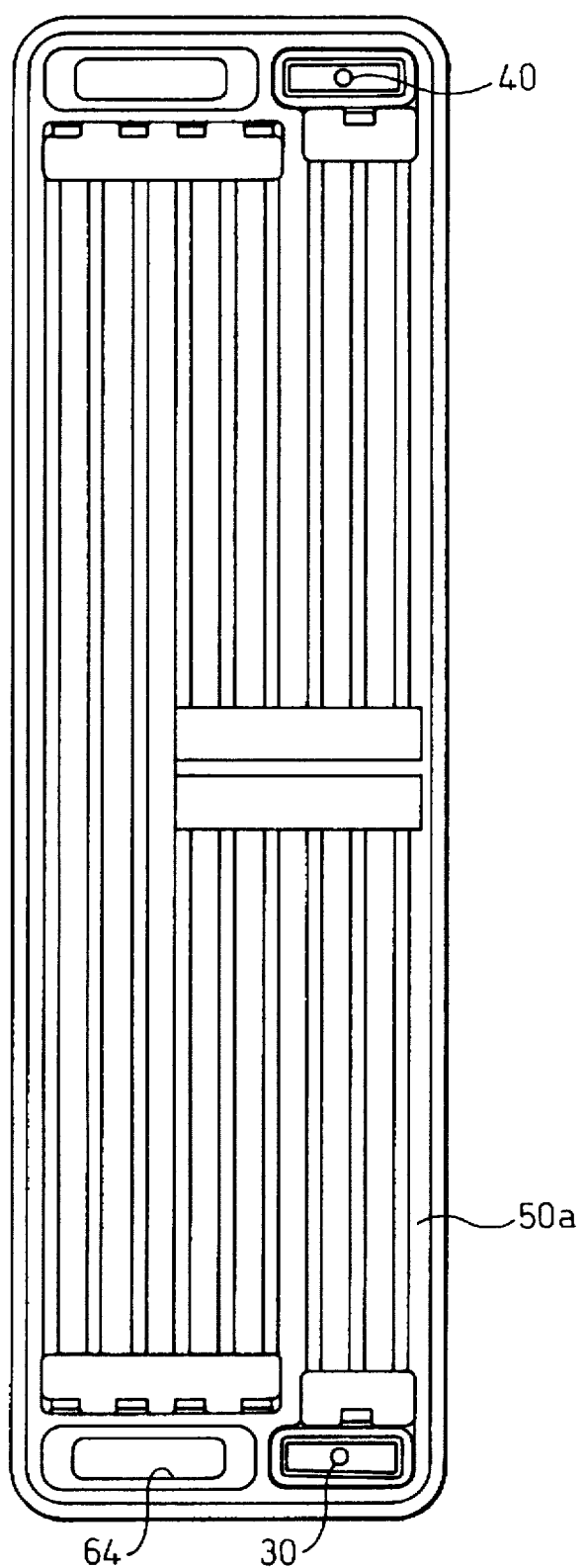
FIG. 6 is similar to FIG. 5 but illustrates a heat exchanging plate located at the rear end in the stack.

The plates 50 and 52 have, at their outer surfaces, recessed structures, which are similar as those at the inner surfaces as explained with reference to FIGS. 5 and 6. The outer recessed surfaces of the plates 50 and 52, which face each other, cooperate with each other to created the second passageways 56 which constructs the outlet passageway 32. Furthermore, as shown in FIGS. 5, 6 and 9, the end plate 48 is formed with an opening 63, which is in communication with openings 64 in the first and second plates 50 and 52, to construct a passageway, which is in communication with the outlet tank 24 of the evaporating section 18, and is also in communication with the second passageways 56. As shown in FIG. 7, the first plate 50a adjacent the end plate 48 is, in place of the opening 58, formed with a throttle opening or valve 40, which is, via the top opening 58 in the second plate 52, in communication with a third passageway 68 between the plates 52 and 48. As shown in FIG. 9, the third passageway 68 is in communication with the bottom opening 62 in the second end plate 48, thereby by-passing the refrigerant.

Thus, the third passageway 68 corresponds to the by-pass passageway 38 in FIG. 1. This by-passing operation is effective when an air conditioning load is low, for example, in the winter season. Thus, the by-passing device can be eliminated when the air conditioning device is used only in a full load mode. Finally, as shown in FIG. 7, the first and second plates 50 and 52, except for the plate 52 located adjacent the end plate 48, are formed with top openings 66, which cooperate with top opening 34 at the front end plate 34 to create an outlet passageway, which is in communication with the second passageways 56, and is also in communication with the outlet port 16-2 (FIG. 3).

Figure 10:
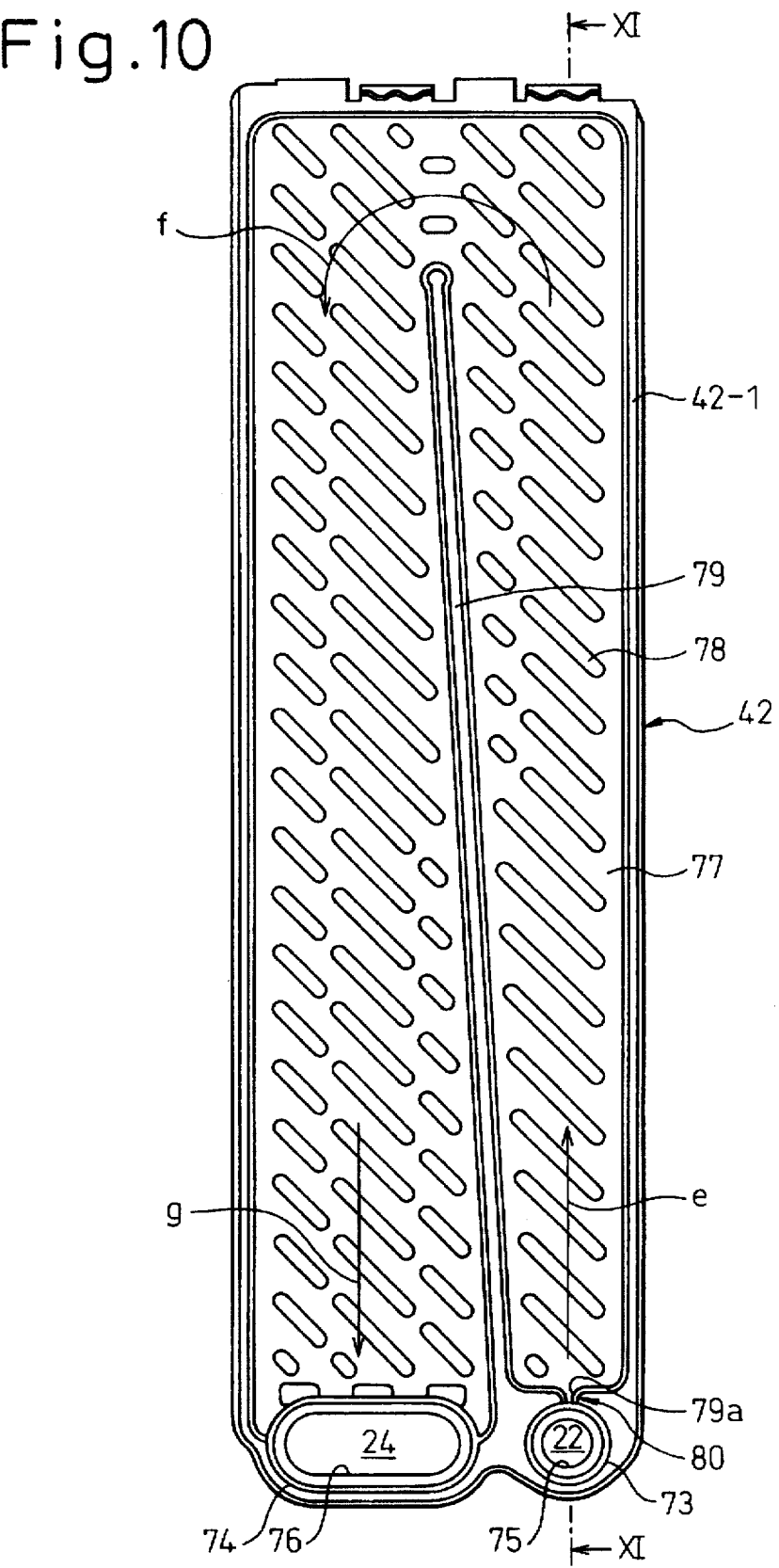
FIG. 10 is a view taken along line X—X in FIG. 4, and shows a front view of a plate in an evaporating section of the evaporator.

Next, a construction of the refrigerant evaporating section 18 will be explained. As shown in FIG. 4, the evaporating section 18 is constructed by a plurality of sets of inwardly recessed plates 42 which are arranged between the middle end plate 48 and a rear end plate 71, and corrugate fins 44 arranged between the sets which are adjacent to each other, and which are connected to the respective plates 42 by means of brazing. Each of fins 44 is formed with a plurality of fine grooves 82, which function to promote a heat exchange between the flow of the refrigerant and the flow of the air. In each of the sets, the plates 42 face each other at their recessed portions, in such a manner that a flattened evaporating pipe or passageway for the refrigerant is created by the plates 42, as will be explained later. As shown in FIG. 10, the plate 42 is formed as a vertically elongated plate and forms at its bottom a first tubular portion 73 and a second tubular portion 74, which are formed as integral tubular portions projected outwardly. As shown in FIG. 4, the first tubular portions 73 with central openings 75 (FIG. 10) are, under the stacked condition of the plates 42, connected with each other to form the inlet tank 22 (FIG. 3), which is in communication with the bottom exchanging section 20. The second tubular portions 74 with central openings 76 (FIG. 10) are, under the stacked condition of the plates 42, connected with each other to form the outlet tank 24, which is in communication with the opening 63, so that the refrigerant from the evaporating section 18 is discharged into the heat exchanging section 20.

Figure 11:
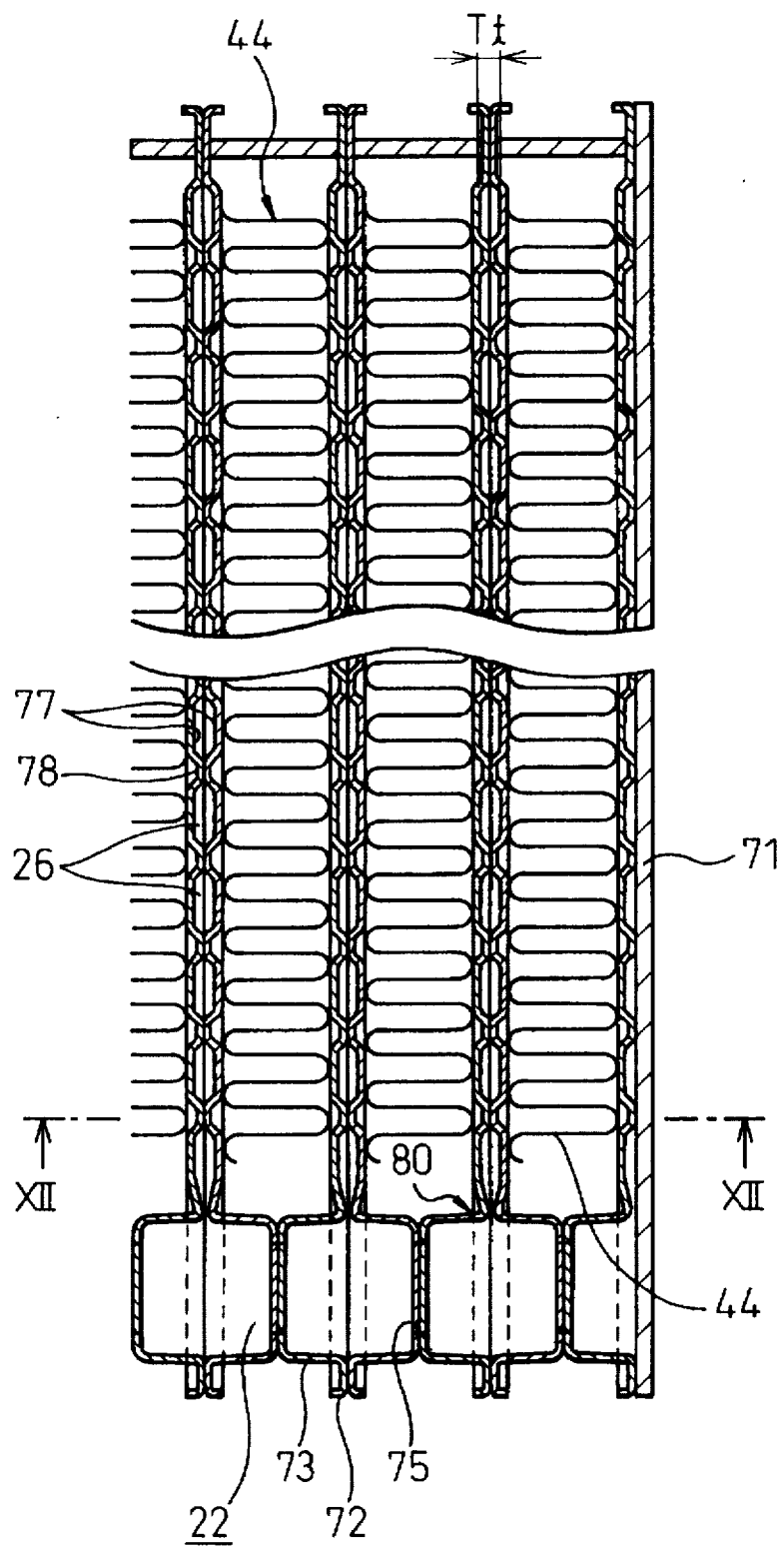
FIG. 11 is a cross-sectional view taken along line XI—XI in FIG. 10.
Figure 12:
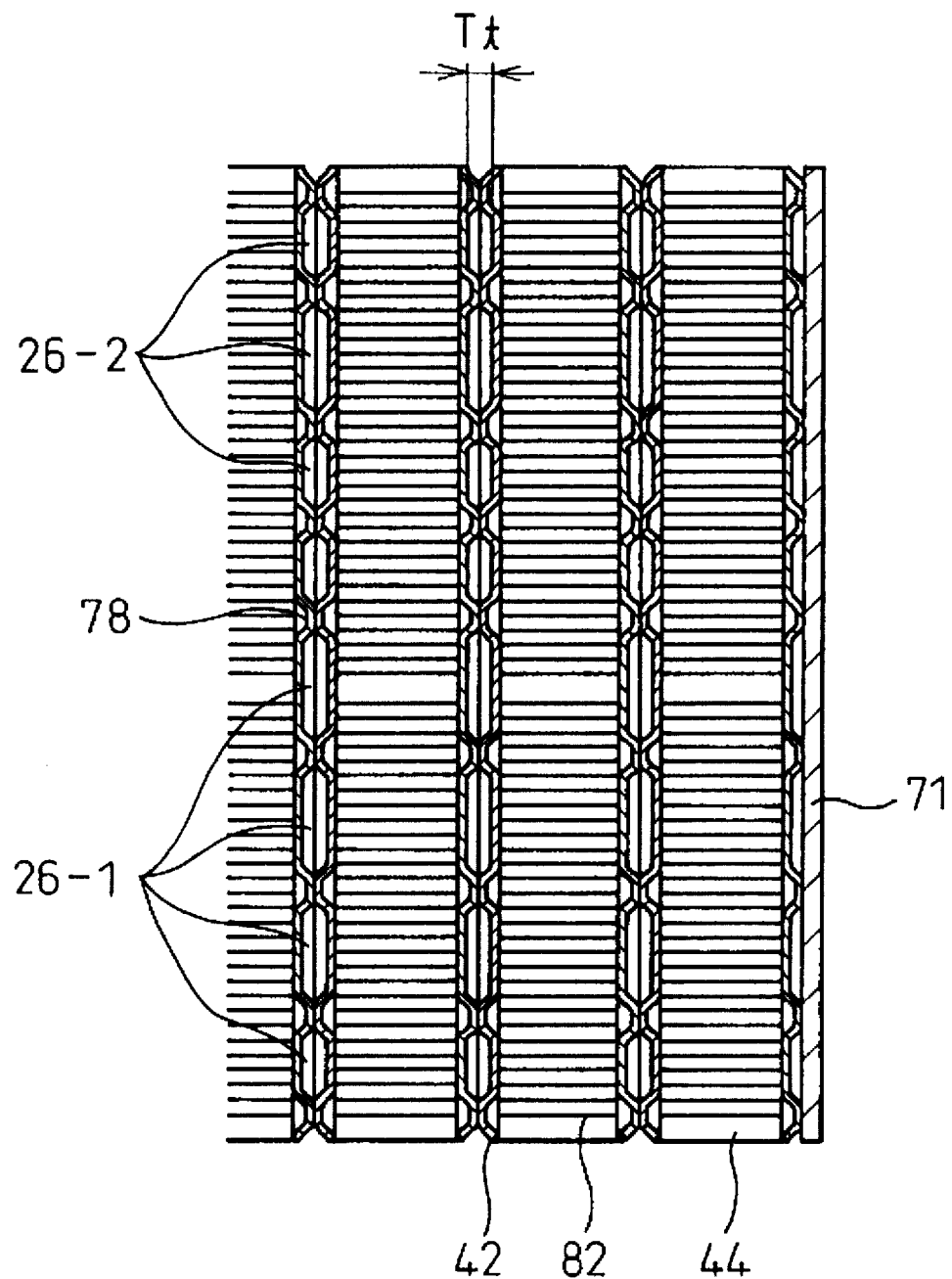
FIG. 12 is a cross-sectional view taken along line XII—XII in FIG. 11.

As shown in FIG. 10, the plate 42 has an outer peripheral portion 42-1 of a closed profile, inwardly of which recessed portion 47 is formed. The two plates 42, which are adjacent with each other, are arranged so that the recessed portions 47 facing each other, construct a flattened evaporating tube of an inner thickness T, as shown in FIG. 12. As shown in FIG. 10, a partition wall 79 extends from a position of the peripheral wall 42-1 between the openings 75 and 76, so that a looped flow of the refrigerant from the opening 75 to the opening 76 is obtained at the end of the partition wall 79 as shown by an arrow f. Namely, the flow is initially directed upwardly, is looped around the tip end of the partition 79, and is moved downwardly. At the inner surface of the recessed portion 77, a plurality of cross ribs 78 are formed so as to extend in a direction intersecting the flow of the refrigerant for promoting the heat transfer capacity. As shown in FIG. 10, the partition 79 extends in a direction which is inclined with respect to the vertical line, so that a gradually increased width of the passageway of the refrigerant from the inlet opening 75 to the outlet opening 76 is obtained. As a result, a pressure loss can be constant along the flow of the refrigerant as shown by the arrow f. At the bottom of the closed wall 42-1, a restricted groove 79a is formed for connecting the inlet opening 75 with the recess 77, so that the refrigerant from the opening 75 is introduced into the recess 77 under a restricted condition. Namely, in the stacked condition of the plates 42 as shown in FIG. 11, between the plates 42, which are adjacent to each other, the recessed portions 77 cooperate to form the evaporating passageway 26, and the restricted grooves 79a cooperate with each other to form an orifice 80 for introducing the refrigerant at a controlled rate. It should be noted that the plates 42 in each pair have an opposite arrangement to the tubular portions 73 and 74 as well as the partition wall 79 along the horizontal direction in FIG. 10. Namely, the partition wall 79 divides the refrigerant passageway 26 into a first section 26-1 (FIG. 12) wherein the refrigerant is moved upwardly as shown by the arrow e in FIG. 10, and a second section 26-2, wherein the refrigerant is moved downwardly as shown by the arrow g in FIG. 10. In each pair of the plates 42, one of the plates 42 has a symmetrical shape compared to the shape of the other plate 42. As a result, when the plates 42 in each pair are arranged so as to face each other as shown in FIGS. 4, 11 and 12, the tubular portions 73, the tubular portions 74 and the partition walls 79 are, between the paired plates 42, registered with each other, thereby forming the inlet tank 22, the outlet tank 24, and evaporating passageways 26. However, the cross-ribs 78 extend obliquely in the same direction as the paired plates 42. Thus, in the facing condition of the paired plates 42, the cross ribs 78, which extend obliquely, are cross each other.

The flow of the refrigerant in the stack of the plates 42 is shown by arrows e, f and g in FIG. 10. Namely, the refrigerant from the heat exchanging section 20 is introduced into the inlet tank 22 constructed by the tubular inlet portions 73 connected with each other in the stack of the plates 42 as shown by an arrow j in FIG. 9. The refrigerant in the inlet tank 22 is distributed upwardly into each of the passageways formed between the recessed portions 77 of a corresponding set of the facing plates 42 via the corresponding orifice 80, as shown by the arrow e. At the top portion of the passageway, the refrigerant turns in a downward direction as shown by the arrow f. Flows of the refrigerant from the looped passageways are combined and introduced into an out-flow tank 24 constructed by the tubular outlet portions 74 connected with each other in the stack of the plates 42, as shown by the arrow g. The refrigerant is, from the outlet tank 24, introduced into the heat exchanging section 20 as shown by an arrow k in FIG. 9. During the flow of the refrigerant in the U-shaped evaporating passageways, the cross ribs 78, which are arranged to intersect each other between faced recess 77 of the plates 42, function to evenly distribute the refrigerant in the U-shaped passageway.

Figure 13:
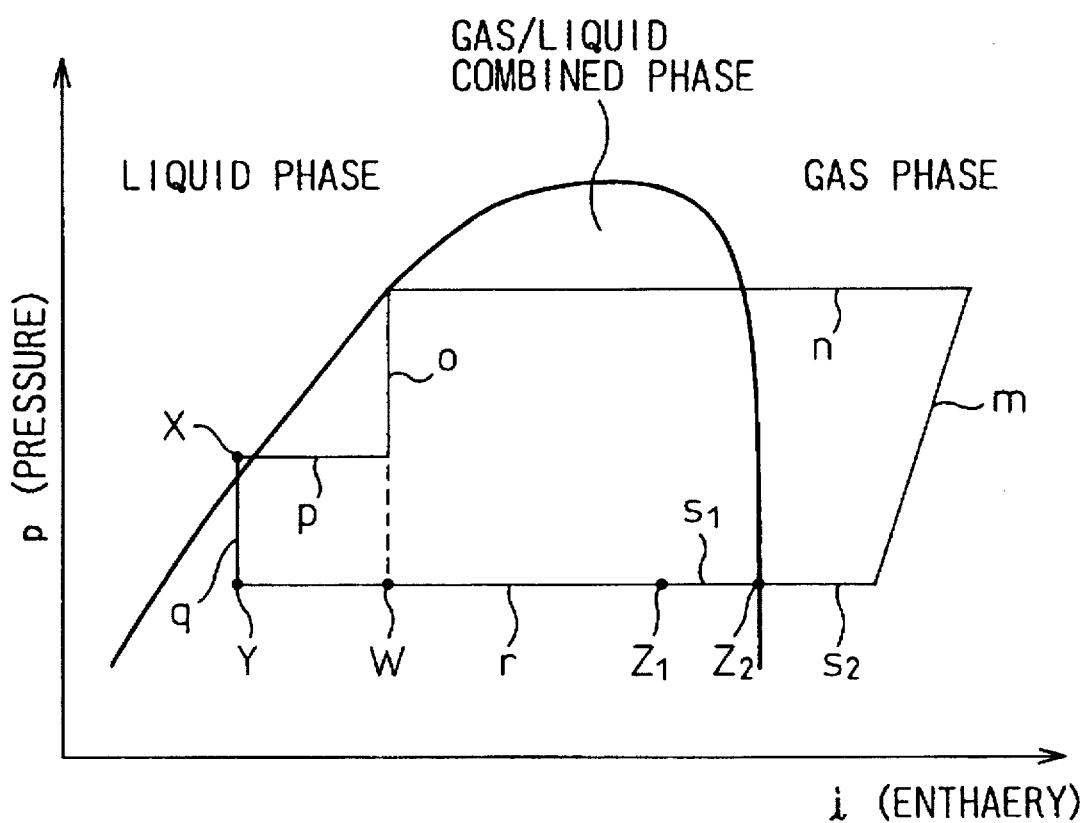
FIG. 13 shows a Mollier diagram illustrating various conditions of the refrigerant in the refrigerating system according to the present invention.

Now, an operation of the above mentioned evaporator in a refrigerating system for an air conditioning system will be explained with reference to FIG. 13 which is a Mollier diagram illustrating various conditions of the refrigerant in the refrigerating system. Operation of the compressor 1 causes the refrigerant to be compressed as shown by a portion m of the chart in FIG. 13. At the condenser 2, heat is emitted as shown by a portion n, so that a phase change of the refrigerant from a gaseous state to a liquid state occurs. In a conventional refrigerating system, an expansion valve 6 causes the refrigerant to be subjected to expansion along a line o to a point w. As a result, at an inlet of the evaporator 16, the refrigerant enters a liquid/gas combined state, which causes a distribution of the refrigerant to be worsened in the evaporator. In the evaporator 16 of an embodiment according to the present invention, the heat exchanging section 20 as a dryness control means is provided at the inlet of the evaporator 16. In the heat exchanging section 20, heat exchange occurs between the introduced flow of the refrigerant of a high temperature in the first passageways 54 (FIG. 8) and the discharged flow of the refrigerant of a low temperature in the second passageways 56. Namely, a provision of the orifices 80 assures that the temperature of the refrigerant discharged from the evaporating section 18 is lower than the temperature of the refrigerant introduced into the evaporating section 18. As a result, the introduced flow at the inlet of the evaporator is subjected to cooling. Namely, as shown in the Mollier diagram in FIG. 13, at the heat exchanging section 20, the refrigerant is cooled along a portion p to a point X, where the refrigerant is fully liquidized.

In an expansion operation by the expansion valve 6, a degree of a dryness x, which is a ratio of the amount of the gaseous state refrigerant to the total amount of the refrigerant, can merely be reduced to a value as high as 0.3 to 0.5. Contrary to this, according to the embodiment of the present invention, a degree of dryness x can be fully reduced to a value as low as 0.01 to 0.2. As a result, an even distribution of the refrigerant to the evaporating passageways 26 between the faced recess 77 of the heat exchanging plates 42 is obtained. Namely, at the orifices 80 at the inlet of the evaporating passageways 26, a pressure reduction occurs as shown by a line q in FIG. 13 to a point Y, where the refrigerant is in a gas-liquid combined state at a low temperature. As a result of a heat exchange between the refrigerant in the heat exchanging passageways 26 and the air flow contacting the fins 44, the temperature of the refrigerant, i.e., the enthalpy of the refrigerant is increased along a line r in FIG. 13. In FIG. 13, at a point Z1, the flows of the refrigerant with a value of the degree of dryness lower than 1.0, which is a partially evaporated condition, are combined at the outlet tank 24 and are introduced into the heat exchanging section 20. Namely, the refrigerant from the evaporating section 18 is introduced into the second passageways 56, and is subjected to a heat exchange with the refrigerant which flows in the first passageways 54 toward the evaporating section 18. As a result of the heat exchange, the outflow refrigerant in the second passageways 56 is heated as shown by a line $s_1$ in FIG. 13, so that the degree of the dryness x is equal to 1.0 at a point $Z_2$ on the equilibrium line and is increased to a value larger than 1.0 as shown by a line $s_2$. Then, the refrigerant is discharged to the compressor 1 via the temperature sensitive tube 8.

In the embodiment of the present invention, the arrangement of the heat exchanging section 20 is adjusted such that the refrigerant after passing through the section 20 has a value of the degree of dryness in a range between 0.01 to 0.2. In case where no adjustment is done, the degree of the dryness of the refrigerant at the outlet of the heat exchanging section 20 would be in a range between 0.3 to 0.5. In such a range of the value of the degree of dryness between 0.3 to 0.5, the refrigerant is likely to flow into the evaporating section under a condition that the refrigerant is divided between the gaseous state and the liquid state. Contrary to this, when the degree of the dryness is controlled to the range between 0.01 to 0.2, a uniform distribution of the refrigerant is realized, which is advantageous from the view point of a reduction in a pressure loss.

In the evaporating section, the inlet side tank 22 is arranged at the gravitational bottom. Thus, the refrigerant introduced into the inlet side tank 22 is, first, easily moved along the tank 22 to a remote end thereof, and is then moved upwardly along the respective evaporating passageways 26. Contrary to this, in an arrangement of an inlet tank at the top, where the refrigerant is moved downwardly in the evaporating passageways, a situation is likely occur that the liquid refrigerant is locally distributed at a front portion of the inlet tank, while the rear end of the tank is mainly occupied by the gaseous refrigerant, which makes the temperature difference large in the direction of the stack of the heat exchanging plates.

The results of a test will now be explained regarding distribution of the refrigerant from the inlet tank 22 into the evaporating passageways 26 when the degree of the dryness x of a value of 0.1 is maintained at the heat exchanging section 20. Namely, in the downward flow arrangement, FIGS. 14-A to 14-C show that the result of the test is when the flow amount of the refrigerant is as high as 150 kg/hour, while FIGS. 15-A to 15-C show the result of the test in the downward flow arrangement when the flow amount of the refrigerant is as low as 50 kg/hour. FIG. 14-A is a schematic illustration showing how the liquid and gaseous phases are distributed in an inlet tank 22. FIG. 14-B is a bar chart illustrating values of flow amount $G_{local}$ of refrigerat passing through respective evaporating passageway 26 along the length of the inlet tank from the inlet. FIG. 14-C is a graph illustrating values of temperature difference ΔTa of the air contacting with the evaporating section 18 along the length of the inlet tank from the inlet. FIGS. 15-A to 15-B show similar characteristics to those of FIGS. 14-A to 14-C, respectively.

As will be easily seen from FIG. 14-A or 15-A, introduction of the refrigerant is localized at the location adjacent the inlet of the tank 22. In other words, at the end spaced from the inlet, the refrigerant is mainly in the gaseous phase. Furthermore, as shown in FIG. 14-B or 15-B, a larger amount $G_{local}$ of the refrigerant is obtained at the inlet. As a result, although temperature difference ΔΔTa is mostly suppressed at the inlet, the temperature difference ΔTa becomes high at a region from an intermediate location to the inner end. In particular, in the case of a low flow amount as shown in FIG. 15-C, an introduction of the liquid state refrigerant can be obtained only at two or three evaporating passageways, and, as to the remaining evaporating passageways, only the refrigerant in a gaseous state is introduced. As a result, a large temperature difference of the air contacting the evaporating section 18 is obtained along the direction of the stack.

FIGS. 16-A to 16-C and 17-A to 17-C show the result of a similar test in the construction in the present invention of the upward flow type, where the inlet side tank 22 is located at the bottom. FIGS. 16-A to 16-C show the result of the test when the flow amount is as high as 150 kg/hour, while FIGS. 17-A to 17-C show a result of the test in the downward flow arrangement when the flow amount of the refrigerant is as low as 50 kg/hour. Due to an arrangement of the inlet tank 22 at the bottom, as shown in FIG. 16-B, a pattern of the flow of the refrigerant introduced into the tank is such that the refrigerant flows first in the tank 22 to its end spaced from the inlet, and then moves upwardly via the respective evaporating passageways 26. This flow pattern is completely opposite to the flow pattern in the downward flow type in FIGS. 14-A to 14-C and FIGS. 15-A to 15-C. As a result, a larger amount of the liquid state refrigerant is obtained at the distal end rather than that at the proximal end. In particular, in the case of a low flow amount as shown in FIG. 16-A, substantially the same amount of the refrigerant is obtained along the entire length of the inlet tank 22. In other words, the liquid state refrigerant is evenly distributed along the length of the tank 22, thereby obtaining an even temperature along the length of the inlet tank as shown in FIG. 16-C. Thus, an increased heat exchanging efficiency as well as a uniform cooling of the air to be discharged to the cabin can be obtained.

Furthermore, the refrigerant section 18 is of the full-pass type where the inflow refrigerant is passed through all of the evaporating passageways 26, which is effective for reducing the pressure loss.

Next, the thickness of the flattened heat exchanging pipes in the direction of the stack will be discussed. The heat exchanging pipes according to the present invention are constructed by pairs of plates 42. In each pair, the plates 42 face each other at their recesses 77, thereby forming a passageway 26 for obtaining a U-shaped flow of the refrigerant as shown by the arrows e, f and g in FIG. 10, and the thickness $T_t$ of the heat exchanging pipe is defined by a distance between the facing bottom surfaces of the recesses 77 of the plates 42, as shown in FIG. 12. Generally, a reduction of the inner thickness $T_t$ of the pipe is advantageous from the view point of an increase in the heat exchange capacity. However, the reduction of the inner thickness $T_t$ is disadvantageous in that the passageway 26 is throttled, thereby increasing the speed of the flow of the refrigerant as well as the pressure loss. In view of this, in a conventional three turn system, it has been believed that the lower limit of the thickness $T_t$ is about 3.5 mm. Namely, in the three turn system, the evaporating passageway is grouped into a first group for an introduction of the refrigerant and a second group for a removal of the refrigerant. Thus, only a part of the heat exchanging pipes are used for the introduction of the refrigerant, thereby reducing the effective flow area of the refrigerant. Furthermore, the refrigerant is subjected to a flow direction change three times in the evaporator. Thus, there has be a lower limit of about 3.5 mm in the inner diameter of the heat exchanging pipe in the three turn system.

Contrary to this, the evaporator of the present invention is an all pass type, where the refrigerant from the inlet tank 22 is introduced into all of the evaporating passageways 26, and therefore, a reduction of the pressure loss is obtained, since the inflow of the refrigerant is less throttled, and the number of turns in the flow of the refrigerant is only one. Thus, a reduction of the thickness to a value less than 3.5 mm is possible, while keeping a desired level of the value the pressure loss across the evaporating passageways. The result of a test by the inventor as to a desired range of the value the inner diameter of the heat exchanging pipe will now be explained.

In FIG. 18, with respect to the inner thickness $T_t$ of the heat exchanging tube in a direction of the stack of the plates 42, a curve C1 shows flow resistance ΔP and a curve C2 shows a ratio of the cooling capacity Q of the evaporating section 18 per unit of area F of a front surface of the evaporator. The test was done when a speed at the front surface was 2 m/second. FIG. 19 shows a compensated curve between the inner thickness $T_t$ of the heat exchanging tube and the ratio Q/F, when the flow resistance ΔP is equalized. In FIG. 18, a point y shows a value of the ratio Q/F when the value of $T_t$ is the permissible minimum value 3.5 mm in the case of the conventional three turn construction.

As is clear from these graphs, it is desirable that a inner thickness $T_t$ of the heat exchanging tube in the direction of the stack is smaller than 3.5 mm, which is effective for increasing the ratio of the heat capacity Q to the effective front area F of the evaporator. It is desirable that the thickness $T_t$ is in a range between 1.6 mm and 3.4 mm. It is more desirable that the thickness $T_t$ is in a range between 2.0 mm to 3.0 mm. This construction can obtain a desirable evaporating capacity, by which the size of the evaporator is reduced.

Next, a second embodiment of the present invention will be explained. Namely, as means for adjusting the degree of the dryness x to a value between 0.01 and 0.2, the heat exchange between the cooling passageway 32 and the cooled passageway 28 is provided for cooling the refrigerant in the cooled passageway 28, in the first embodiment. In the second embodiment, in place of such a heat exchange, a gas and liquid separation means is provided, where means is provided for separation of the gas/liquid combined refrigerant to the gaseous phase and liquid phase. In FIG. 20, an evaporator 100 is, as similar to the first embodiment, constructed by an evaporating section 18, a gas/liquid separation chamber 103, an inlet pipe 104 connected to the phase separation chamber 103 for introduction of the refrigerant, and an outlet 105 for removal of the refrigerant. These parts are integrally connected with each other by means of brazing. Conserving the components of the similar functions already explained with reference to the first embodiment, an explanation thereof is omitted to avoid unnecessary repetition, and the same reference numerals are used. The phase separation chamber 103 includes two plates 103a and 103b, each constructed by a core plate having, on both surfaces thereof, coatings of aluminum based brazing material of low melting temperature. As shown in FIG. 22, each of the plates 103a and 103b is, on its surface, formed with a plurality of dimples 109, and a middle rib 110 extending vertically. The plate 103a includes, at its bottom, a bulged bottom portion 111, while the plate 103b includes, at its bottom, a bulged bottom portion 112. When the plates 103a and 103b are combined, the dimples 109 are in face-to-face contact, which functions to strengthen the combined structure, and to make the gas/liquid combined flows contact each other, thereby promoting a phase separation.

The plates 103a and 103b are brazed to each other, so that a phase separation chamber 103 is formed between the plates 103a and 103b. In this combined state, in addition to the dimples 19, the middle ribs 110 are contacted to each other as shown in FIG. 23, so that the middle ribs 110 divides the separation chambers into inlet tank 113 and outlet tank 114, at the bottom corresponding to the bulged portions 111 and 112, and inlet chamber 115 and an outlet chamber 116 at the top. The inlet chamber 115 and outlet chamber 116 are in communication with the inlet tank 113 and the outlet tank 114, respectively. The inlet chamber 115 and the outlet chamber 116 are in communication with each other via a passageway 110-1 at the top end of the rib 110.

The inlet pipe 104 is, at its end 104-1, inserted into an opening in the front plate 103a until the pipe 104 contacts an inner surface of the rear plate 103b. The inlet pipe 104 is formed with a burr portion 117 (FIG. 21), which engages with the outer surface of the front plate 103a. As shown in FIGS. 21 and 22, the end 104-1 of the inlet pipe 104 is formed with a cutout 118, which is opened downwardly to the inlet chamber 115. The outlet pipe 105 is, at its end, merely in face-to-face contact with the outer surface of the front plate 103a, so that the outlet pipe 105 is opened to the outlet chamber 116.

The refrigerant of a gas/liquid combined state of reduced pressure from the expansion valve 6 is introduced into the inlet section 115 of the phase separation 10 chamber 103. Due to the fact that the end portion 104-1 is inserted into the chamber section 115 so that the pipe 104 is opened to the section 115 via the bottom cutout portion 118, the gas/liquid combined state refrigerant is introduced downwardly into the chamber section 115. A force of inertia directed downwardly as well as a gravity force cause the phase separation to be generated between the gaseous phase and the liquid phase. As a result, as shown in FIG. 24, the liquid refrigerant is stored at the bottom of the inlet chamber 115, and is introduced into the bottom inlet tank 22 of the evaporating section 18.

In this embodiment, the degree of the dryness of the refrigerant when introduced into the inlet tank 22 is controlled to a suitable range between 0.01 to 0.2. The gaseous refrigerant separated in the separator 103 is directly introduced into the outlet chamber 116 and combined with the gaseous refrigerant from the evaporating section 18.

As to the evaporating section 18, the construction is the same as that in the first embodiment. Namely, the evaporating section 18 is constructed by a stack of flattened tubes, each constructed by plates 42 and corrugated fins 44. The value of an inner thickness $T_f$ (FIG. 21) of the flattened tube is in a range between 2.0 to 3.0 mm.

We claim:

1. A refrigerating system comprising:

a compressor for compressing a refrigerant;

a condenser connected to the compressor for condensing the refrigerant from the compressor;

a pressure reducer connected to the condenser for reducing a pressure of the condensed gas;

an evaporator connected to the pressure reduced for evaporating the refrigerant from the pressure reducer; and;

means arranged between the pressure reducer and the evaporator for controlling a degree of dryness of the refrigerant introduced into the evaporator;

said evaporator comprising;

a stack of flattened tubes defining therein vertically extending heat exchanging passageways;

an inlet tank at a bottom of the stack for distributing, into all of said heat exchanging passageways, the refrigerant after having passed through the dryness control means; and an outlet tank at a bottom of the stack for discharging the refrigerant after having passed through the heat exchanging passageways;

an arrangement of said dryness control means with respect to the evaporator being such that a value of the degree of the dryness at said inlet tank is in a range between 0.01 to 0.2; and a value of the thickness of each flattened tubes being in a range between 2.0 to 3.0 nm.

2. A refrigerating system according to claim 1, wherein said dryness control means comprise a first passageway for connecting the pressure reducer with the inlet tank of the evaporator and a second passageway for connecting the outlet tank of the evaporator with the compressor, the first and second passageways being arranged in such a manner that a heat exchange occurs between the refrigerant passed through the first passageway and the refrigerant passed through the second passageway.

3. A refrigerating system according to claim 1, wherein said dryness control means comprise separator means arranged between the pressure reducer and the evaporator for separating the refrigerant between a gaseous phase and liquid phase, and means for connecting the separator means with the inlet tank of the evaporator, thereby introducing the refrigerant in the liquid phase into the inlet tank.

4. A refrigerating system according to claim 3, wherein said separator means comprise:

a first chamber having an inlet at its top for receiving the refrigerant from the pressure reducer and an outlet for communication with the inlet tank, and;

a second chamber having an inlet at a bottom for communication with the outlet tank and an outlet at its top for discharging the refrigerant;

said first and second chambers being in communication with each other at their top portions.

5. An evaporator comprising:

an evaporating section; and a dryness control means for controlling a dryness of a refrigerant introduced into the evaporating section, said evaporating section comprising:

a stack of flattened tubes defining therein vertically extending heat exchanging passageways;

an inlet tank at a bottom of the stack for distributing, into all of said heat exchanging passageways, the refrigerant after passed through the dryness control means; and an outlet tank at a bottom of the stack for discharging the refrigerant after passed through the heat exchanging passageways;

an arrangement of said dryness control means with respect to the evaporating being such that a value of the degree of the dryness at said inlet tank is in a range between 0.01 to 0.2;

a value of the thickness of each flattened tubes of the evaporating section being in a range between 2.0 to 3.0 mm.

* * * * *